United States Patent
Okabe

(10) Patent No.: US 9,966,760 B2
(45) Date of Patent: May 8, 2018

(54) POWER DISTRIBUTION DETERMINATION APPARATUS, CONTROL METHOD, AND STORAGE MEDIUM

(71) Applicant: NEC Corporation, Tokyo (JP)

(72) Inventor: Toshiya Okabe, Tokyo (JP)

(73) Assignee: NEC Corporation, Tokyo (JP)

( * ) Notice: Subject to any disclaimer, the term of this patent is extended or adjusted under 35 U.S.C. 154(b) by 346 days.

(21) Appl. No.: 14/698,170

(22) Filed: Apr. 28, 2015

(65) Prior Publication Data

US 2015/0309549 A1    Oct. 29, 2015

(30) Foreign Application Priority Data

Apr. 28, 2014 (JP) .................................. 2014-093046

(51) Int. Cl.
*G06F 1/26* (2006.01)
*H02J 3/00* (2006.01)
(Continued)

(52) U.S. Cl.
CPC ............... *H02J 3/00* (2013.01); *G06Q 10/04* (2013.01); *G06Q 50/06* (2013.01); *H02J 3/006* (2013.01); *H02J 2003/007* (2013.01); *Y02E 60/76* (2013.01); *Y04S 10/525* (2013.01); *Y04S 40/22* (2013.01)

(58) Field of Classification Search
CPC ........ H02J 3/00; H02J 3/006; H02J 2003/007; G06Q 10/04; G06Q 50/06; Y02E 60/76; Y04S 10/525; Y04S 40/22
See application file for complete search history.

(56) References Cited

U.S. PATENT DOCUMENTS

| 2010/0094476 A1* | 4/2010 | Hamilton, II | G01D 4/004 |
| | | | 700/295 |
| 2010/0274407 A1* | 10/2010 | Creed | H02J 3/14 |
| | | | 700/295 |
| 2012/0065792 A1* | 3/2012 | Yonezawa | H02J 3/14 |
| | | | 700/291 |

FOREIGN PATENT DOCUMENTS

| JP | 2001-184406 | 7/2001 |
| JP | 2002-304443 | 10/2002 |

(Continued)

OTHER PUBLICATIONS

Notification of Reasons for Refusal dated Jan. 30, 2018, issued by the Japan Patent Office (JPO) in counterpart Japanese Patent Application No. 2014-093046.

*Primary Examiner* — Kenneth M Lo
*Assistant Examiner* — David J Wynne
(74) *Attorney, Agent, or Firm* — Finnegan, Henderson, Farabow, Garrett & Dunner, L.L.P.

(57) ABSTRACT

A supply information acquisition unit acquires supply information indicating supply energy from a power supply unit. A demand information acquisition unit acquires demand information indicating a demand energy from a power receiving unit and accepting conditions. A first matching unit performs first matching for determining the power supply unit that supplies power to each power receiving unit so as to fulfill accepting conditions of each power receiving unit. A surplus power supply unit determination unit determines a surplus power supply unit, which is the power supply unit having a surplus supply energy. An arbitrary power receiving unit determination unit determines an arbitrary power receiving unit, which is the power receiving unit in which a demand energy is not fulfilled.

16 Claims, 27 Drawing Sheets

(51) Int. Cl.
  *G06Q 10/04* (2012.01)
  *G06Q 50/06* (2012.01)

(56) References Cited

FOREIGN PATENT DOCUMENTS

| | | |
|---|---|---|
| JP | 2002-354667 | 12/2002 |
| JP | 2003-299248 | 10/2003 |
| JP | 2003-323559 | 11/2003 |
| JP | 2012-10489 | 1/2012 |
| JP | 2012-85454 | 4/2012 |
| JP | 2013-169039 | 8/2013 |
| JP | 2013-219393 | 10/2013 |
| WO | WO 2011/067992 | 6/2011 |

* cited by examiner

FIG. 5

| POWER SUPPLY UNIT ID | SUPPLY ENERGY |
|---|---|
| S1 | 15kWh |
| S2 | 5kWh |
| ... | ... |

FIG. 6

| POWER RECEIVING UNIT ID (302) | DEMAND ENERGY (304) | ACCEPTING CONDITIONS (306) |
|---|---|---|
| D1 | 15kWh | POWER SUPPLY UNIT S1 : 10kWh<br>POWER SUPPLY UNIT S2 : 3kWh<br>ANY : REMAINDER |
| D2 | 5kWh | POWER SUPPLY UNIT S2 : 5kWh |
| ... | ... | ... |

| POWER RECEIVING UNIT ID | DEMAND ENERGY | ACCEPTING CONDITIONS |
|---|---|---|
| D1 | 15kWh | PRIORITY 0 : POWER SUPPLY UNIT S1<br>PRIORITY 1 : POWER SUPPLY UNIT S2<br>PRIORITY 2 : ANY |
| D2 | 5kWh | PRIORITY 0 : POWER SUPPLY UNIT S2<br>PRIORITY 1 : POWER SUPPLY UNIT S3 |
| ... | ... | ... |

302 — POWER RECEIVING UNIT ID
304 — DEMAND ENERGY
306 — ACCEPTING CONDITIONS

FIG. 8

| POWER SUPPLY UNIT ID | SUPPLY ENERGY | ATTRIBUTES | | | |
|---|---|---|---|---|---|
| | | POWER UNIT PRICE | ENVIRONMENTAL TAX | TYPE OF POWER SOURCE | AMOUNT OF CO2 EMISSIONS |
| S1 | 15kWh | 10 yen / kWh | 0.1% | WIND POWER | 25g/kWh |
| S2 | 5kWh | 20 yen / kWh | 0.5% | THERMAL POWER, STORAGE BATTERY | 900g/kWh |
| ... | ... | ... | ... | ... | ... |

| POWER RECEIVING UNIT ID (302) | DEMAND ENERGY (304) | ACCEPTING CONDITIONS (306) | TARGET VALUE (308) |
|---|---|---|---|
| D1 | 15kWh | PRIORITY 0 : S1, S2 | AMOUNT OF $CO_2$ EMISSIONS : 10 kg / DAY |
| ... | ... | ... | ... |

| FIRST MATCHING ID | POWER SUPPLY UNIT |
|---|---|
| 0010 | S1, S5 |
| 0009 | S3, S4 |
| 0008 | S1 |
| ... | ... |

FIG. 23

| FIRST MATCHING ID | POWER RECEIVING UNIT |
|---|---|
| 0010 | D1: 3kWh<br>D4: 2kWh |
| 0009 | D3: 4kWh<br>D4: 5kWh |
| 0008 | D1: 3kWh |
| ... | ... |

502
504
500

POWER DISTRIBUTION DETERMINATION APPARATUS, CONTROL METHOD, AND STORAGE MEDIUM

This application is based on Japanese patent application No. 2014-093046, the content of which is incorporated hereinto by reference.

BACKGROUND

Technical Field

The present invention relates to a power distribution determination apparatus, a control method, and a storage medium storing a program.

Related Art

In power transactions or power retailing, it is possible to purchase power by specifying power supply sources. Here, the power supply sources may be specified in units of producers such as an electric power company or an electric power producer, and may be specified by power source types (such as green energy). For example, Japanese Unexamined Patent Publication No. 2001-184406 discloses a power supply system capable of previously specifying power consumption for each of a plurality of power source types such as green energy generation or nuclear power generation with respect to daily or monthly power consumption.

Power may be exchanged between a plurality of power supply sources and a plurality of consumers. In this case, each of the consumers is not necessarily able to receive as much power as desired from desired power supply sources. As a result, consumers who are not able to receive a supply of power as desired acquire power from power supply sources having a surplus of power.

Here, when consumers have received a supply of power as desired, the consumers can understand how much power has been supplied from which power supply source. However when the consumers have not received a supply of power as desired, the consumers are not able to recognize "from which power supply source and to what extent energy, which has not been fulfilled by the desired power supply source, has been supplied". Further, electric power companies and the like are not able to recognize, when power sources possessed by the companies supply power to consumers, "whether the power sources supplied power to consumers who desire power to be supplied from the power sources, or whether the power sources supplied power to consumers who do not desire power to be supplied from the power sources but was supplied power in order to make up for a shortage".

An object of the invention is devised in view of the above problems. An object of the invention is to provide a technique for recognizing the distribution of power from a plurality of power supply sources to a plurality of consumers.

SUMMARY

In one exemplary embodiment, there is provided a power distribution determination apparatus that determines a distribution of power from a plurality of power supply units to a plurality of power receiving units, comprising: a supply information acquisition unit that acquires supply information from each of the power supply units, supply information indicating a supply energy, the supply energy being energy being able to be supplied or expected energy being able to be supplied from the power supply unit; a demand information acquisition unit that acquires demand information from each of the power receiving units, the demand information indicating a demand energy and accepting conditions, the demand energy being a required energy or an expected required energy, the accepting condition being condition related to a power supply unit that accepts to supply power; a first matching unit that performs first matching for determining one or a plurality of the power supply units that supply power to each of the power receiving units so as to fulfill the accepting conditions corresponding to each power receiving unit; a surplus power supply unit determination unit that determines a surplus power supply unit by a result of the first matching, the surplus power supply unit being the power supply unit in which a portion or the entirety of the supply energy is not used; and an arbitrary power receiving unit determination unit that determines an arbitrary power receiving unit with a result of the first matching, the arbitrary power receiving unit being the power receiving unit in which a portion or the entirety of the demand energy is not fulfilled.

In another exemplary embodiment, there is provided a control method executed by a computer that determines a distribution of power from a plurality of power supply units to a plurality of power receiving units, comprising: a supply information acquisition step of acquiring supply information from each of the power supply units, the supply information indicating a supply energy, the supply energy being energy being able to be supplied or expected energy being able to be supplied from the power supply unit; a demand information acquisition step of acquiring demand information from each of the power receiving units, the demand information indicating a demand energy and accepting conditions, the demand energy being a required energy or an expected required energy, the accepting condition being condition related to a power supply unit that accepts to supply power; a first matching step of performing first matching for determining one or a plurality of the power supply units that supply power to each of the power receiving units so as to fulfill the accepting conditions corresponding to each power receiving unit; a surplus power supply unit determination step of determining a surplus power supply unit with a result of the first matching, the surplus power supply unit being the power supply unit in which a portion or the entirety of the supply energy is not used; and an arbitrary power receiving unit determination step of determining an arbitrary power receiving unit with a result of the first matching, the arbitrary power receiving unit being the power receiving unit in which a portion or the entirety of the demand energy is not fulfilled.

In another exemplary embodiment, there is provided a non-transitory computer-readable storage medium storing a program that causes a computer to execute a function of each functional configuration unit included in the power distribution determination apparatus, and thus causing the computer to have a function of operating as the power distribution determination apparatus.

According to the present invention, it is possible to provide a technique for recognizing the distribution of power from a plurality of power supply sources to a plurality of consumers.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 5 is a diagram illustrating supply information in a table form.

FIG. 6 is a diagram illustrating demand information in a table form.

FIG. 7 is a diagram illustrating demand information in which priority is given to accepting conditions, in a table form.

FIG. 8 is a diagram illustrating supply information indicating attributes in a table form.

FIG. 11 is a diagram illustrating demand information further indicating target values.

FIG. 18 is a diagram illustrating information stored in a first history storage unit, in a table form.

FIG. 23 is a diagram illustrating information stored in a second history storage unit, in a table form.

DETAILED DESCRIPTION

Figure 1:
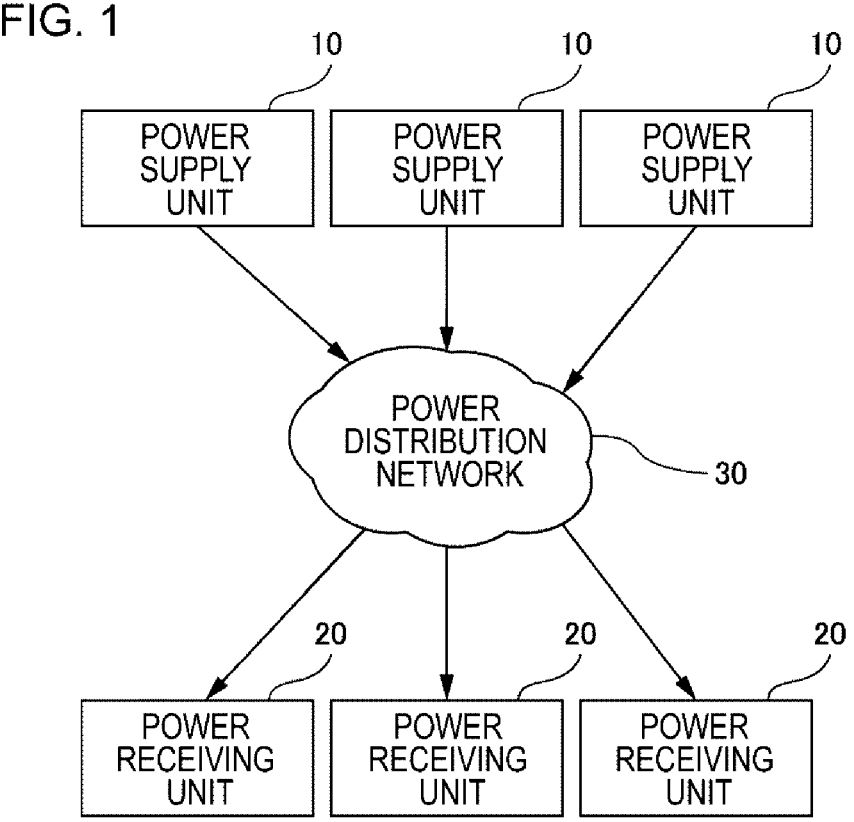
FIG. 1 is a block diagram illustrating power supply units and power receiving units used as targets of a power distribution determination apparatus according to Exemplary Embodiment 1.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, exemplary embodiments of the present invention will be described with reference to the accompanying drawings. In all the drawings, like elements are referenced by like reference numerals and descriptions thereof will not be repeated.

Exemplary Embodiment 1

FIG. 1 is a block diagram illustrating power supply units 10 and power receiving units 20 which are used as targets of a power distribution determination apparatus 2000 according to Exemplary Embodiment 1. In FIG. 1, arrows indicate a flow of power. Further, in FIG. 1, each block represents a function-based block rather than a hardware-based configuration.

The power distribution determination apparatus 2000 determines the distribution of power to each of the power receiving units 20 from each of the power supply units 10. Each of the power supply units 10 supplies power to one or a plurality of power receiving units 20 through a power distribution network 30. The power supply unit 10 includes a power generation apparatus that generates power and supplies the power, a power storage apparatus that supplies stored power, or the like. Here, the power supply unit 10 may include a plurality of power generation apparatuses or a plurality of power storage apparatuses. In addition, the power supply unit 10 may include a combination of one or more power generation apparatuses and one or more power storage apparatuses. Meanwhile, the power supply unit 10 may be possessed by an electric power company, and may be possessed by other corporations or individuals.

The power receiving unit 20 includes various loads that consume received power, a power storage apparatus that stores received power, or the like. Here, the power receiving unit 20 may include a plurality of loads or a plurality of power storage apparatuses. In addition, the power receiving unit 20 may include a combination of one or more loads and one or more power storage apparatuses. Meanwhile, a consumer who possesses the power receiving unit 20 may be a corporation, and may be an individual.

The power distribution network 30 may be configured to be capable of distributing power from each of the power supply units 10 to each of the power receiving units 20 as determined by the power distribution determination apparatus 2000, and the configuration method is not limited. For example, the power distribution network 30 may include one or a plurality of distribution apparatuses that distribute power, or the like, and is configured so that desired power distribution can be realized by changing the setting of the distribution apparatus.

Figure 2:
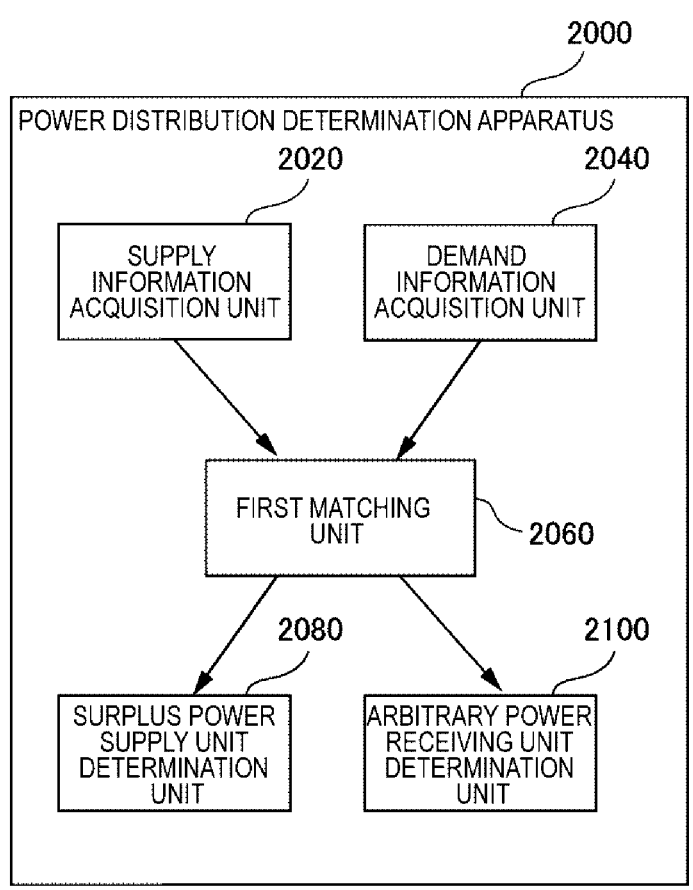
FIG. 2 is a block diagram illustrating the power distribution determination apparatus according to Exemplary Embodiment 1.

FIG. 2 is a block diagram illustrating the power distribution determination apparatus 2000 according to Exemplary Embodiment 1. In FIG. 2, arrows indicate a flow of information. Further, in FIG. 2, each block represents a function-based block rather than a hardware-based configuration. The power distribution determination apparatus 2000 includes a supply information acquisition unit 2020, a demand information acquisition unit 2040, a first matching unit 2060, a surplus power supply unit determination unit 2080, and an arbitrary power receiving unit determination unit 2100.

<Supply Information Acquisition Unit 2020>

The supply information acquisition unit 2020 acquires supply information indicating supply energy with respect to each of the power supply units 10. The supply energy is energy or an expected energy which can be supplied by the power supply unit 10.

<Demand Information Acquisition Unit 2040>

The demand information acquisition unit 2040 acquires demand information with respect to each of the power receiving units 20. The demand information indicates demand energy and an accepting condition. The demand energy is energy or expected energy which is required by the power receiving unit 20. The accepting conditions are conditions related to the power supply unit 10 from which the power receiving unit 20 is supplied with power.

<First Matching Unit 2060>

The first matching unit 2060 performs first matching. The first matching is a process of determining one or a plurality of power supply units 10 that supply power to each of the power receiving units 20 so as to fulfill accepting conditions corresponding to each of the power receiving units 20.

In a situation where each of the power receiving units 20 specifies accepting conditions, it is not sure that power can be distributed so as to fulfill the demand energy of all the power receiving units 20. For example, it is assumed that the supply energy of a power supply unit S1 is 7 kWh, that the demand energy of a power receiving unit D1 is 10 kWh, and that the demand energy of a power receiving unit D2 is 5 kWh. In both sets of the accepting conditions of the power receiving units D1 and D2, it is assumed that S1 is specified as the power supply unit 10 that accepts to supply power. In this case, the total of the demands exceeds the supply, and desires of both the power receiving units D1 and D2 are not able to be fulfilled. Consequently, for example, the first matching unit 2060 allocates a portion of the supply energy of the power supply unit S1 to each of the power receiving units D1 and D2. For example, 4 kWh is allocated to the power receiving unit D1, and the remaining 3 kWh is allocated to the power receiving unit D2. As a result, both the power receiving units D1 and D2 become a state where a portion of the demand energy is not fulfilled.

In addition, for example, the first matching unit 2060 may allocate 5 kWh as desired to the power receiving unit D2 of which desire can be fulfilled, and allocate the remaining 2 kWh to the power receiving unit D1. In this case, a portion of the demand energy is not fulfilled in the power receiving unit D1, and the demand energy is fulfilled in the power receiving unit D2.

As another example, it may be considered that a portion or the entirety of the supply energy of the power supply unit 10 is not used. For example, it can be assumed that the supply energy of the power receiving unit D1 is 7 kWh, that the supply energy of the power supply unit S1 is 10 kWh, and that the supply energy of a power supply unit S2 is 5 kWh. The accepting conditions of the power receiving unit D1 indicate that the supply of power is received from any of the power supply units S1 and S2. In this case, the total of the supplies exceeds the demand. Thus, for example, the first matching unit 2060 allocates a portion of the supply energy of the power supply unit S1 and a portion of the supply energy of the power supply unit S2 to the power receiving unit D1. For example, 4 kWh is allocated from the power supply unit S1, and the remaining 3 kWh is allocated from the power supply unit S2. As a result, both the power supply units S1 and S2 also become a state where a portion of the supply energy is not used.

In addition, for example, the first matching unit 2060 may allocate 5 kWh from the power supply unit S2 capable of using the entirety of the supply energy, and allocate the remaining 2 kWh from the power supply unit S1. In this case, the power supply unit S1 does not use a portion of the supply energy, and the power supply unit S2 uses the entirety of the supply energy. A detailed method of the first matching will be described later.

<Surplus Power Supply Unit Determination Unit 2080>

As a result of the first matching, the surplus power supply unit determination unit 2080 determines a surplus power supply unit, which is a power supply unit 10 in which a portion or the entirety of the supply energy is not used.

<Arbitrary Power Receiving Unit Determination Unit 2100>

As a result of the first matching, the arbitrary power receiving unit determination unit 2100 determines an arbitrary power receiving unit, which is a power receiving unit 20 in which a portion or the entirety of the demand energy is not fulfilled.

<Hardware Configuration>

Each functional configuration unit of the power distribution determination apparatus 2000 may be realized by hardware components (such as, for example, hard-wired electronic circuits) for realizing each functional configuration unit, and may be realized by a combination of hardware components and software components (such as, for example, combination of electronic circuits and programs for controlling the circuits).

Figure 3:
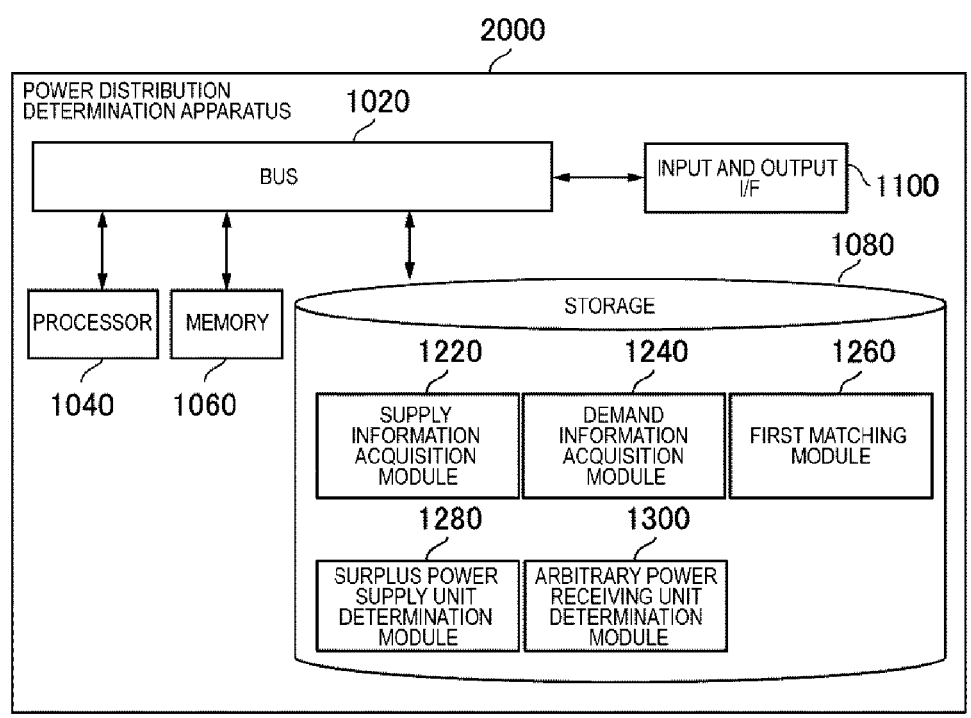
FIG. 3 is a block diagram illustrating a hardware configuration of the power distribution determination apparatus.

FIG. 3 is a block diagram illustrating a hardware configuration of the power distribution determination apparatus 2000. The power distribution determination apparatus 2000 includes a bus 1020, a processor 1040, a memory 1060, a storage 1080, and an input and output interface 1100. The bus 1020 is a data transmission channel in order for the processor 1040, the memory 1060, the storage 1080, and the input and output interface 1100 to mutually transmit and receive data. However, a method of connecting the processor 1040 and the like to each other is not limited to bus connection. The processor 1040 is an arithmetic processing unit such as, for example, a CPU (Central Processing Unit) or a GPU (Graphics Processing Unit). The memory 1060 is a memory such as, for example, a RAM (Random Access Memory) or a ROM (Read Only Memory). The storage 1080 is a storage device such as, for example, a hard disk, an SSD (Solid State Drive), or a memory card. In addition, the storage 1080 may be a memory such as a RAM or a ROM. The input and output interface 1100 is an input and output interface in order for the power distribution determination apparatus 2000 to transmit and receive data to and from an external apparatus or the like. When the demand information and the supply information are acquired from outside of the power distribution determination apparatus 2000, the power distribution determination apparatus 2000 acquires the demand information and the supply information using the input and output interface 1100. Meanwhile, the input and output interface 1100 may be an interface for acquiring information from an input device such as a keyboard, an interface for acquiring information from an external device such as a storage, and an interface for acquiring information through a network.

The storage 1080 stores a supply information acquisition module 1220, a demand information acquisition module 1240, a first matching module 1260, a surplus power supply unit determination module 1280, and an arbitrary power receiving unit determination module 1300, as programs for realizing the function of the power distribution determination apparatus 2000.

The processor 1040 executes each module which is stored in the storage 1080, to thereby realize the functions of the supply information acquisition unit 2020, the demand information acquisition unit 2040, the first matching unit 2060, the surplus power supply unit determination unit 2080, and the arbitrary power receiving unit determination unit 2100.

For example, when the processor 1040 executes each of the modules, these modules may be read out onto the memory 1060 and then be executed, and may be executed without being read out onto the memory 1060.

The hardware configuration of the power distribution determination apparatus 2000 is not limited to the configuration shown in FIG. 3. For example, each of the modules may be stored in the memory 1060. In this case, the power distribution determination apparatus 2000 may not include the storage 1080.

<Flow of Processes>

Figure 4:
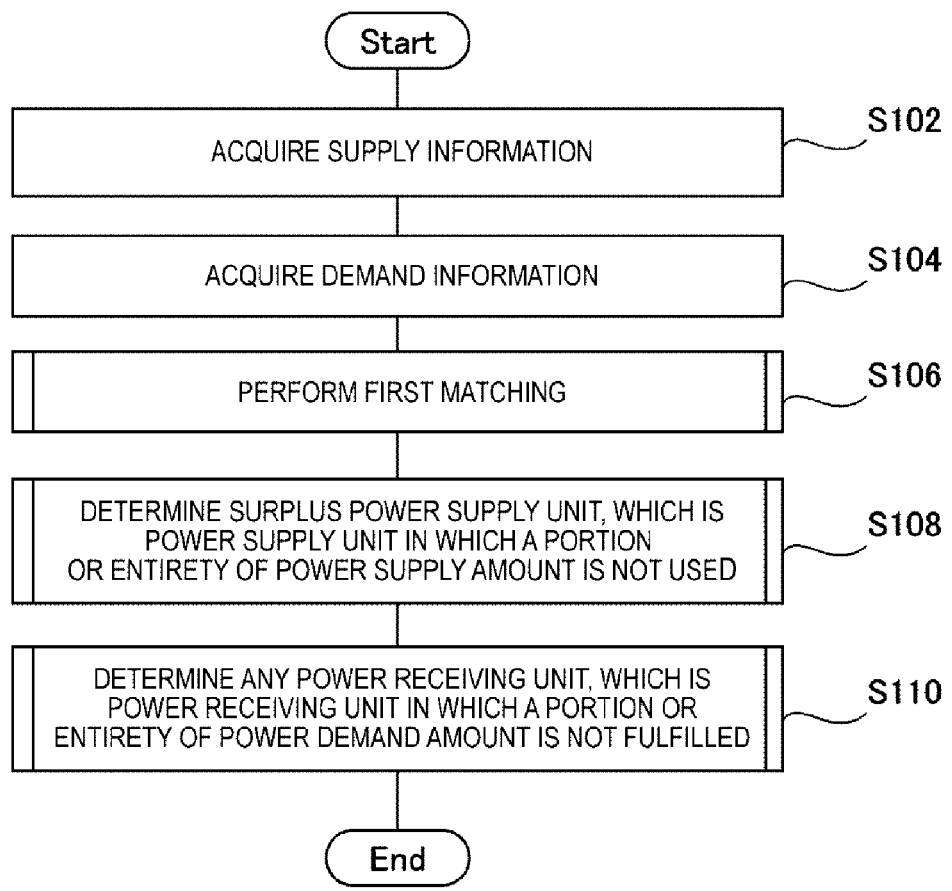
FIG. 4 is a flow diagram illustrating a flow of processes executed by the power distribution determination apparatus according to Exemplary Embodiment 1.

FIG. 4 is a flow diagram illustrating a flow of processes executed by the power distribution determination apparatus 2000 according to Exemplary Embodiment 1. In step S102, the supply information acquisition unit 2020 acquires the supply information with respect to each of the power supply units 10. In step S104, the demand information acquisition unit 2040 acquires the demand information with respect to each of the power receiving units 20. In step S106, the first matching unit 2060 performs the first matching. In step S108, as a result of the first matching, the surplus power supply unit determination unit 2080 determines a surplus power supply unit, which is a power supply unit 10 having surplus energy that can be supplied with. In step S110, as a result of the first matching, the arbitrary power receiving unit determination unit 2100 determines an arbitrary power receiving unit, which is a power receiving unit 20 in which supply energy falls below the demand energy.

<Operational Effects>

According to the power distribution determination apparatus 2000 of the present exemplary embodiment, the first matching is performed in which a portion or the entirety of the supply energy of each power supply unit 10 is allocated to each power receiving unit 20 so as to fulfill the accepting conditions of each power receiving unit 20. As a result of the first matching, a power supply unit 10 in which a portion or the entirety of the supply energy is not used is determined as a surplus power supply unit, and a power receiving unit 20 in which a portion or the entirety of the demand energy is not fulfilled is determined as an arbitrary power receiving unit. As a result, according to the power distribution determination apparatus 2000 of the present exemplary embodiment, it is possible to recognize 1) which power supply unit 20 was not able to receive a supply of power as desired, and 2) which power supply unit 10 has a remaining supply energy. When the recognized information is provided to an electric power company or the like which manages the power supply unit 10 or a consumer who possesses the power receiving unit 20, the electric power company or the like or the consumer can recognize the distribution of power from a plurality of power supply units 10 to a plurality of power receiving units 20.

Hereinafter, further details of the present exemplary embodiment will be described.

<Details of Supply Information Acquisition Unit 2020>

Figure 5:
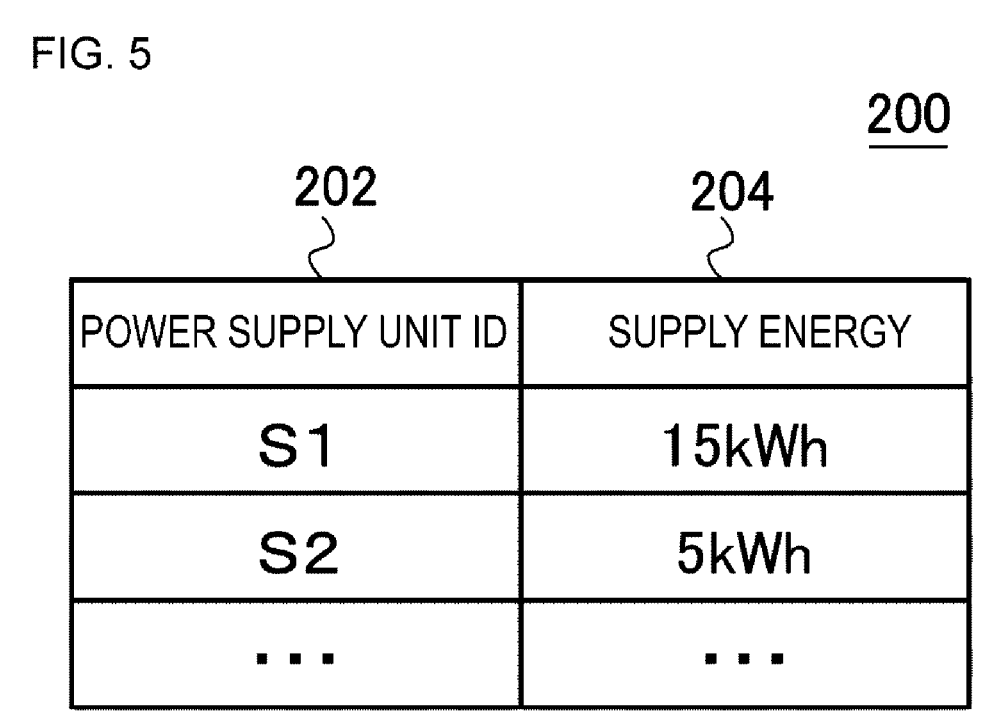

FIG. 5 is a diagram illustrating supply information in a table form. The supply information shown in FIG. 5 is denoted as a supply information table 200. The supply information table 200 has two columns named a power supply unit ID 202 and a supply energy 204. In each record of the supply information table 200, the supply energy of the power supply unit 10 identified by the power supply unit ID 202 is indicated in the supply energy 204.

For example, the supply information is provided by an electric power company or the like which possesses the power supply unit 10. For example, the supply information acquisition unit 2020 acquires the supply information which is input from an external apparatus possessed by an electric power company or the like. In addition thereto, for example, the supply information acquisition unit 2020 may acquire supply information that a manager or the like of the power distribution determination apparatus 2000 manually inputs. Further, the supply information acquisition unit 2020 may access an external apparatus possessed by the electric power company or the like, and acquire supply information.

However, the supply information may not be provided from the electric power company or the like which possesses the power supply unit 10. For example, the supply information may be generated by the power distribution determination apparatus 2000. In this case, it is considered that the supply energy of the power supply unit 10 is predicted on the basis of past operations of the power supply unit 10, and the supply information is generated using the predicted results.

<Details of Demand Information Acquisition Unit 2040>

For example, the demand information is provided by a consumer who possesses the power receiving unit 20. For example, the demand information acquisition unit 2040 may acquire the demand information that an external apparatus of a consumer inputs. In addition thereto, for example, the demand information acquisition unit 2040 may acquire demand information that a manager or the like of the power distribution determination apparatus 2000 manually inputs. Further, the demand information acquisition unit 2040 may access an external apparatus possessed by the consumer, and acquire supply information.

However, the demand information may not be provided from the consumer or the like who possesses the power receiving unit 20. For example, the demand information may be generated by the power distribution determination apparatus 2000. In this case, it is considered that the demand energy of the power receiving unit 20 is predicted on the basis of past operations of the power receiving unit 20, and the demand information is generated using the predicted results.

There are various accepting conditions indicated by the demand information. For example, the accepting conditions indicate an ID of the power supply unit 10 that accepts to supply power. Here, the accepting conditions may indicate a plurality of IDs of the power supply unit 10 that accepts to supply power.

In addition, for example, the accepting conditions indicate conditions for an attribute of the power supply unit 10. For example, the attribute of the power supply unit 10 may be a type of power source (power generation device or power storage device) that receives a supply of power. In this case, for example, the accepting conditions indicate a condition such as "type of power source: wind power generation". Here, the accepting conditions may indicate a plurality of types of a power source that receives a supply of power. In this case, for example, the accepting conditions indicate a condition such as "type of power source: wind power generation or storage battery".

In addition, the conditions for an attribute of the power supply unit 10 may be conditions for cost involved in a supply of power from the power supply unit 10. Here, the cost is determined by the power unit price of the power supply unit 10, the environmental tax on the use of the power supply unit 10, and the like. For example, the environmental tax is determined based on the type of power generation device or power storage device constituting the power supply unit 10, and the like. In this case, for example, the accepting conditions indicate a condition such as "power unit price: 20 yen/kWh or less".

In addition, a condition for an attribute of the power supply unit 10 may be a condition for an influence of the power supply unit 10 on the environment (hereinafter, environmental load). For example, the environmental load is represented by the amount of $CO_2$ emissions per unit time or the like. In addition, a condition for an attribute of the power supply unit 10 may indicate the size of compensation or the like which is provided to a consumer in a demand response. The demand response is a mechanism in which compensation or the like is provided to a consumer who has contributed to a stable supply of power by an action such as "abstention from using power at peak hours". From a consumer's viewpoint, it can be said that as compensation or the like in the demand response becomes larger in the power supply unit 10, the more improved the service becomes from the power supply unit 10. Consequently, for example, a condition for an attribute of the power supply unit 10 indicates a condition such as "compensation of the demand response: X or greater". Here, there are various compensations in the demand response. For example, the compensations include a discount in electricity rates, or an offer of a predetermined amount of money or points.

Further, the accepting conditions may indicate the energy supplied from each of the plurality of power supply units 10 that accept to supply power. For example, the accepting conditions may indicate conditions in which "10 kWh is received from the power supply unit S1, 5 kWh is received from the power supply unit S2, and the remainder is received from any power supply unit". Similarly, the accepting conditions may indicate the percentage of the energy to be supplied, which is accepted by each of the plurality of power supply units 10 that accept to supply power. For example, the accepting conditions may indicate conditions in which "½ of the demand energy is received from the power supply unit S1, ⅓ is received from the power supply unit S2, and the remainder is received from any power supply unit". In addition, similarly, the accepting conditions may indicate a plurality of conditions for the type of the power source or indicate a plurality of conditions for cost. Further, the accepting conditions may indicate the size or percentage of the energy, which is accepted for each type or cost of the power source. Specifically, the accepting conditions indicate conditions in which "10 kWh is received from a power source performing wind power generation, and 5 kWh is received from a storage battery" or "10 kWh is received from a power supply unit 10 having a power unit price of 20 yen/kWh or less, and 5 kWh is received from a power supply unit 10 having a power unit price of 30 yen/kWh".

FIG. 6 is a diagram illustrating demand information in a table form. The demand information shown in FIG. 6 is denoted as a demand information table 300. The demand information table 300 has three columns named a power receiving unit ID 302, a demand energy 304, and accepting conditions 306. In each record of the demand information table 300, regarding the power receiving unit 20 which is identified by the power receiving unit ID 302, the demand energy is indicated in the demand energy 304, and the accepting conditions are indicated in the accepting conditions 306. The accepting conditions 306 of FIG. 6 indicate the energy to be supplied, which is accepted by each of the plurality of power supply units 10 that accept to supply power. Here, "any" means "any arbitrary power supply unit 10".

Further, as shown in FIG. 7, priority may be given to the accepting conditions 306. For example, the first row of FIG. 7 shows that in the power receiving unit D1, priority of the power supply unit S1 is highest, priority of the power supply unit S2 is next highest, and priority of "arbitrary power supply unit" is lowest.

Meanwhile, when the accepting conditions are conditions for an attribute of the power supply unit 10, the supply information indicates at least an attribute corresponding to the accepting condition. For example, when the accepting conditions are conditions for the cost of the power supply unit 10, the supply information indicates the cost of the power supply unit 10. FIG. 8 is a diagram illustrating supply information indicating attributes in a table form. In FIG. 8, attributes 206 indicates the power unit price, the environmental tax, the type of power source and the amount of $CO_2$ emissions.

<Details of First Matching Unit 2060>

Figure 9:
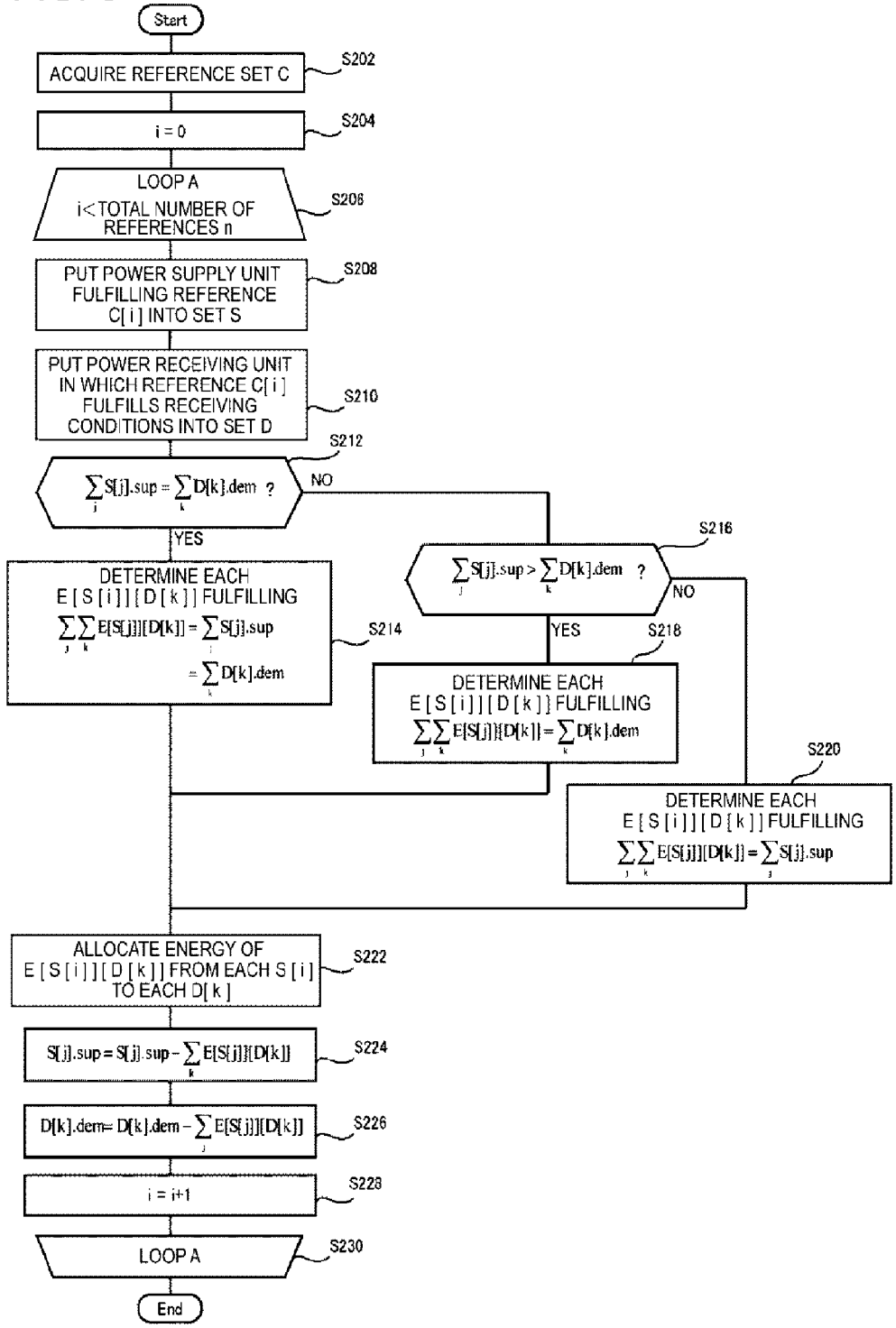
FIG. 9 is a flow diagram illustrating a flow of first matching performed by a first matching unit.

The first matching which is performed by the first matching unit 2060 will be described in detail with reference to FIG. 9. FIG. 9 is a flow diagram illustrating a flow of the first matching performed by the first matching unit 2060. The process of FIG. 9 is obtained by detailing the process performed in step S106 of FIG. 4. However, the flow diagram shown in FIG. 9 is merely illustrative, and the flow of the first matching is not limited to the flow shown in FIG. 9.

In step S202, the first matching unit 2060 acquires a set C which is a reference for selecting the power supply unit 10. Here, what is acquired as the reference set C is dependent on the accepting conditions. For example, when the accepting conditions indicate the power supply unit 10 that accepts to supply power, the set C indicates a set of IDs of the power supply unit 10 such as {power supply unit S1, power supply unit S2, . . . }. For example, when the accepting conditions indicate allowable values for cost, the set C indicates a set of allowed costs such as {cost X1 or less, cost X2 or less, . . . }. The reference set C may be stored in an external apparatus or the like, and may be input from an external apparatus or the like. In addition, the reference set C may be generated by the power distribution determination apparatus 2000 by analyzing the demand information.

In step S204, the first matching unit 2060 sets a counter i to 0.

Steps S206 to S230 are a loop process A which is executed while a repetition condition of "i<n" is fulfilled. Here, n is the reference total number (number of elements of the set C). In step S206, the first matching unit 2060 determines whether the repetition condition is fulfilled. When the repetition condition is fulfilled, the process of FIG. 9 proceeds to step S208. On the other hand, when the repetition condition is not fulfilled, the process of FIG. 9 is terminated.

In step S208, the first matching unit 2060 adds the power supply unit 10 fulfilling a reference C[i] to a set S. For example, in a case where the set C is a set of IDs of the power supply unit 10 that accepts to supply power {power supply unit S1, power supply unit S2, . . . }, the power supply unit S1 enters S[0053] when i=0, and the power supply unit S2 enters S[0054] when i=1. In addition, for example, in a case where the set C is a set of allowable values for cost {cost X1 or less, cost X2 or less, . . . }, each power supply unit 10 having a cost of X1 or less when i=0 enters S[0055], and a power supply unit 10 having a cost of X2 or less enters S[0056] when i=1.

In step S210, the first matching unit 2060 adds a power receiving unit 20 in which the reference C[i] fulfills the accepting conditions to a set D. For example, in a case where the set C is a set of IDs of the power supply unit 10 that accepts to supply power {power supply unit S1, power supply unit S2, . . . }, a power receiving unit 20 that receives a supply of power from the power supply unit S1 enters D[0058] when i=0, and a power receiving unit 20 that receives a supply of power from the power supply unit S2 enters D[0059] when i=1. In addition, for example, in a case where the set C is a set of allowable values for cost {cost X1 or less, cost X2 or less, . . . }, each power receiving unit 20 indicating "cost X1 or less" in the accepting conditions enters D[0060] when i=0, and each power receiving unit 20 indicating "cost X2 or less" in the accepting conditions enters D[0061] when i=1.

In step S212, the first matching unit 2060 determines whether the following Conditional Expression (1) is fulfilled.

$$\sum_j S[j].sup = \sum_k D[k].dem \qquad (1)$$

S[j] is any power supply unit 10 included in the set S. D[k] is any power receiving unit included in the set D. S[j].sup indicates the energy which is not yet allocated to a supply of power to the power receiving unit 20 in the supply energy of the power supply unit S[j]. D[k].dem is the energy to which a supply of power from the power supply unit 10 is not yet allocated within the demand energy of the power receiving unit D[k].

When Conditional Expression (1) is fulfilled (YES in step S212), the process of FIG. 9 proceeds to step S214. On the other hand, when Conditional Expression (1) is not fulfilled (NO in step S212), the process of FIG. 9 proceeds to step S216.

In step S214, the first matching unit 2060 determines the energy E[S[j]][D[k]] which is supplied from each S[j] to each D[k] so as to fulfill the following Conditional Expression (2). The fulfillment of Conditional Expression (1) means that supply and demand are coincident with each other. Therefore, each S[j] can supply the entirety of the supply energy, and each D[k] can receive the entirety of the demand energy.

$$\sum_j \sum_k E[S[j]][D[k]] = \sum_j S[j].sup \qquad (2)$$
$$= \sum_k D[k].dem$$

Meanwhile, various algorithms can be used in a method of determining each E[S[j]][D[k]] so as to fulfill Conditional Expression (2). For example, the first matching unit 2060 can solve the determination of E[S[j]][D[k]] using various optimization problems. As an objective function of the optimization problem, any objective function can be set. For example, a combination of each power supply unit S[j] and each power receiving unit D[k] is weighted on the basis of a physical distance between S[j] and D[k], or the like. This weight is set to w[j][k]. The first matching unit 2060 uses the following Expression (3) as an objective function, and determines each E[S[j]][D[k]] so as to minimize this objective function. However, Expression (3) is merely illustrative, and the first matching unit 2060 can also use various objective functions other than the above expression. The objective function may be stored in an internal storage unit of the power distribution determination apparatus 2000, be stored in the external storage unit of the power distribution determination apparatus 2000, and be manually input.

$$\sum_j \sum_k w[j][k] * E[S[j]][D[k]] \qquad (3)$$

In addition, the first matching unit 2060 may calculate E[S[j]][D[k]] using methods other than the method of solving an optimization problem. For example, the power supply units 10 within the set S and the power receiving units 20 within the set D may be appropriately ranked respectively, and E[S[j]][D[k]] be determined so as to use the power supply units 10 and the power receiving units 20, respectively, in order from the top.

On the other hand, in step S216, the first matching unit 2060 determines whether the following Conditional Expression (4) is fulfilled. When Conditional Expression (4) is fulfilled, the process of FIG. 9 proceeds to step S218. On the other hand, when Conditional Expression (4) is not fulfilled, the process of FIG. 9 proceeds to step S220.

$$\sum_j S[j].sup > \sum_k D[k].dem \qquad (4)$$

In step S218, the first matching unit 2060 determines the energy E[S[j]][D[k]] which is supplied from each power supply unit S[j] to each power receiving unit D[k] so as to fulfill the following Conditional Expression (5). Here, the fulfillment of Conditional Expression (4) means that supply exceeds demand. For this reason, a portion or the entirety of the supply energy is not used with respect to one or more S[j].

$$\sum_j \sum_k E[S[j]][D[k]] = \sum_k D[k].dem \qquad (5)$$

In a method of determining each E[S[j]][D[k]] so as to fulfill Conditional Expression (5), an algorithm for solving an optimization problem, or the like can be used similarly to the method of determining each E[S[j]][D[k]] so as to fulfill Conditional Expression (2) described above.

Here, as described above, in order to fulfill Conditional Expression (5), a portion or the entirety of the supply energy is not used with respect to one or more S[j]. For example, the first matching unit 2060 determines a power supply unit 10 in which a portion or the entirety of the supply energy is not used, using various methods. For example, the first matching unit 2060 appropriately ranks the power supply units 10 included in the set S, and excludes an extra supply energy (exceeding demand) in order from the top or the bottom. For example, the relations of S[0071].sup=10 kWh, S[0072]=12 kWh, and S[0073]=5 kWh are established. The total of the supply energy is assumed to be greater by 15 kWh than the total of the demand energy. In this case, the first matching unit 2060 excludes the entirety of the supply energy (10 KWh) of S[0074], and excludes 5 kWh within the supply energy of S[0075].

In addition, the first matching unit 2060 may determine E[S[j]][D[k]] using various algorithms without determining the power supply unit 10 in which a portion or the entirety of the supply energy is not used. In this manner, in which power supply unit 10 a portion or the entirety of the supply energy is not used is obtained as a result of calculating each E[S[j]][D[k]].

On the other hand, in step S220, the first matching unit 2060 determines the energy E[S[j]][D[k]] which is supplied from each power supply unit S[j] to each power receiving unit D[k] so as to fulfill the following Conditional Expression (6). Here, the non-fulfillment of Conditional Expression (4) (NO in step S216) means demand exceeds supply. For this reason, a portion or the entirety of the demand energy is not fulfilled with respect to one or more D[k].

$$\sum_j \sum_k E[S[j]][D[k]] = \sum_j S[j].sup \quad (6)$$

In a method of determining each E[S[j]][D[k]] so as to fulfill Conditional Expression (6), various methods such as an algorithm for solving an optimization problem can be used similarly to the method of determining each E[S[j]][D[k]] so as to fulfill Conditional Expression (2) described above.

Here, as described above, in order to fulfill Conditional Expression (6), a portion or the entirety of the demand energy is not fulfilled with respect to one or more D[j]. For example, the first matching unit 2060 determines a power receiving unit 20 in which a portion or the entirety of the demand energy is not fulfilled, using various methods. For example, the first matching unit 2060 appropriately ranks the power receiving units 20 included in the set D, and excludes an extra demand energy in order from the top or the bottom. For example, the relations of D[0080].dem=10 kWh, D[0081]=12 kWh, and D[0082]=5 kWh are established. The total of the demand energy is assumed to be greater by 15 kWh than the total of the supply energy. In this case, the first matching unit 2060 excludes the entirety of the demand energy (10 KWh) of D[0083], and excludes 5 kWh within the demand energy of D[0084].

In addition, the first matching unit 2060 may determine E[S[j]][D[k]] using various algorithms without determining a power receiving unit 20 in which a portion or the entirety of the demand energy is not fulfilled. In this manner, in which power supply unit 20 a portion or the entirety of the demand energy is not fulfilled is obtained as a result of calculating each E[S[j]][D[k]].

In step S222, the first matching unit 2060 allocates the energy of E[S[j]][D[k]] from each S[j] to each D[k].

In step S224, the first matching unit 2060 updates the supply energy of each S[j] using the following Expression (7).

$$S[j].sup = S[j].sup - \sum_k E[S[j]][D[k]] \quad (7)$$

In step S226, the first matching unit 2060 updates the demand energy of each D[k] using the following Expression (8).

$$D[k].dem = D[k].dem - \sum_j E[S[j]][D[k]] \quad (8)$$

In step S228, the first matching unit 2060 adds 1 to the counter i. Since step S230 is a terminus of the loop process A, the process of FIG. 9 proceeds to step S206.

<<Case where Energy is Specified for Each Accepting Condition>>

For example, as shown in FIG. 6, the energy is determined for each accepting condition. In this case, S[j].sup in each of the expressions described above is replaced by S[j].sup[C[i]]. S[j].sup[C[i]] indicates the supply energy with respect to a portion in which the reference C[i] is fulfilled, in the supply energy of the power supply unit S[j]. For example, it is assumed that the power supply unit S[j] includes a power source 1 and a power source 2, and that only the power source 1 is assumed to fulfill the reference C[i]. In this case, S[j].sup[C[i]] indicates only the energy that can be supplied from the power source 1.

Regarding D[k].dem, similarly, D[k].dem is replaced by D[k].dem[C[i]] in each of the expressions in FIG. 9. D[k].dem[C[i]] indicates the energy to be accepted from the power supply unit 10 in which the reference C[i] is fulfilled, in the demand energy of the power receiving unit D[j]. For example, the energy to be accepted from the power supply unit S1 by the power receiving unit D[k] and the energy to be accepted from the power supply unit S2 by the power receiving unit, in the accepting conditions, are respectively indicated. Only the power supply unit S1 is assumed to fulfill the reference C[i]. In this case, D[k].dem[C[i]] indicates only the energy which is accepted from the power supply unit S1, in the demand energy of the power receiving unit D[k].

<<Case where Priority is Present in Accepting Conditions>>

As shown in FIG. 7, priority may be given to a plurality of accepting conditions indicated by the demand information. In this case, for example, the first matching unit 2060 performs the first matching in a flow shown in FIG. 10. Here, in FIG. 10, a flow of steps S212 to S230 is the same as that in FIG. 9, and thus a portion of the flow diagram is omitted.

Figure 10:
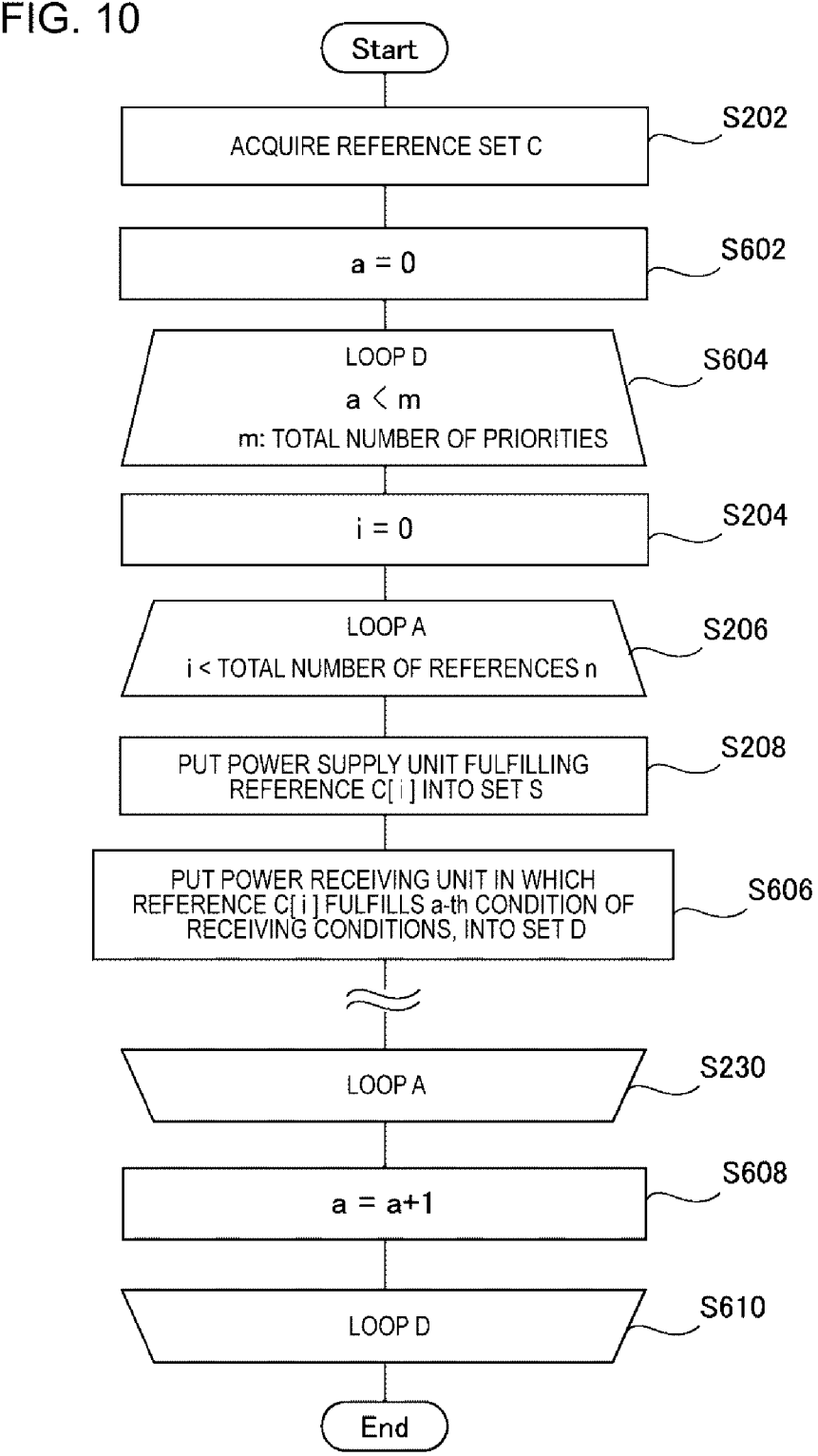
FIG. 10 is a flow diagram illustrating a flow of the first matching performed by the first matching unit when priority is given to the accepting conditions.

The flow diagram of FIG. 10 indicates the execution of the loop process A with respect to each priority. First, in step S602, the first matching unit 2060 initializes a counter a to 0. Steps S604 to S610 are a loop process D which is executed while a repetition condition of "a<m" is fulfilled. Here, m is the total number of priorities. For example, when priorities 0 to priority 9 are present, the value of m is 10. In step S604, the first matching unit 2060 determines whether the repetition condition is fulfilled. When the repetition condition is fulfilled, the process of FIG. 10 proceeds to step S204. On the other hand, when the repetition condition is not fulfilled, the process of FIG. 10 is terminated.

In FIG. 10, a method of generating the set S is the same as that in FIG. 9 (step S208). On the other hand, in FIG. 10, a method of generating the set D is different from that in FIG. 9. In step S606, the first matching unit 2060 puts a power receiving unit in which the reference C[i] fulfills an a-th condition of the accepting conditions, into the set D.

A detailed description will be given with reference to the example of FIG. 7. Here, a reference C[0096] is assumed to indicate the power supply unit S2. First, the reference C[0097] when a=0 is considered. In the power receiving unit D1, a power supply unit of priority 0 is S1 and is not the power supply unit S2. On the other hand, in the power receiving unit D2, a power supply unit of priority 0 is S2.

Consequently, the first matching unit 2060 does not put the power receiving unit D1 into the set D, and puts the power receiving unit D2 into the set D.

Next, the reference C[0099] when a=1 is considered. In the power receiving unit D1, a power supply unit of priority 1 is S2. On the other hand, in the power receiving unit D2, a power supply unit of priority 1 is S3, and is not S2. Consequently, the first matching unit 2060 puts the power receiving unit D1 into the set D, and does not put the power receiving unit D2 into the set D.

When the loop process A is terminated with respect to any one priority, the process of FIG. 10 proceeds to step S608. In step S608, the first matching unit 2060 adds 1 to the counter a. Since step S610 is a terminus of the loop process D, the process of FIG. 10 proceeds to step S604.

As described above, since the loop process A is performed in order of priority, the first matching unit 2060 performs the first matching using accepting conditions preferentially in which high priority is given.

<<Dynamic Grant of Priority>>

Conditions other than the accepting conditions may be set in each of the power receiving units 20. For example, a target value may be set for $CO_2$ emitted by the power supply unit 10 that accepts to supply power. For example, this target value is indicated by the demand information. FIG. 11 is a diagram illustrating demand information further indicating a target value.

For example, in order to achieve this target value, the first matching unit 2060 changes priority dynamically with respect to the accepting condition. A detailed description will be given with reference to FIG. 11. In FIG. 11, the accepting conditions of the power receiving unit D1 indicate the power supply units S1 and S2, and the both are given priority 0. Under this condition, when the energy consumption on a certain day is large, and if power continues to be used as it is, the amount of $CO_2$ emissions is determined to exceed the target value. For example, a case is considered where "the amount reaches 80% of the target value at twelve noon" or the like.

In this case, the first matching unit 2060 dynamically changes the priority of the accepting conditions of the power receiving unit D1 so as to give high priority to a power supply unit having a small amount of $CO_2$ emissions. Here, the amounts of $CO_2$ emissions of the power supply units S1 and S2 are as shown in FIG. 8. In this case, the first matching unit 2060 changes the priority of the power supply unit S2 having a large amount of $CO_2$ emissions to priority 1. The first matching unit 2060 performs the first matching shown in FIG. 10 using the changed priority. In this manner, the power receiving unit D1 is configured to accept a supply of power preferentially from the power supply unit S1 having a small amount of $CO_2$ emissions.

<Details of Surplus Power Supply Unit Determination Unit 2080>

Figure 12:
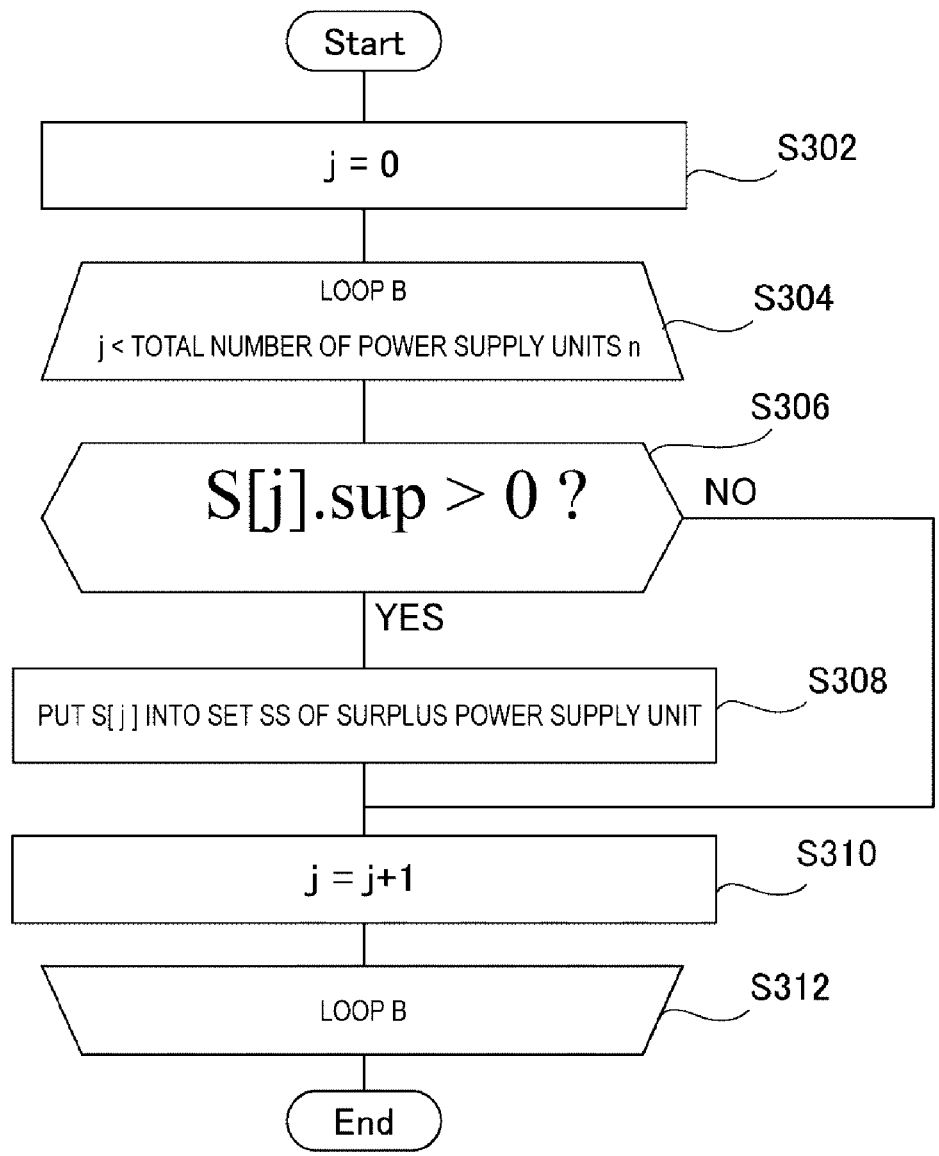
FIG. 12 is a flow diagram illustrating a flow of processes executed by a surplus power supply unit determination unit.

A process performed by the surplus power supply unit determination unit 2080 will be described in detail with reference to FIG. 12. FIG. 12 is a flow diagram illustrating a flow of processes executed by the surplus power supply unit determination unit 2080. The process of FIG. 12 is obtained by detailing the process performed in step S108 of FIG. 4.

In step S302, the surplus power supply unit determination unit 2080 sets a counter j to 0. Steps S304 to S312 are a loop process B executed while a repetition condition of "j<n" is fulfilled. Here, n is the total number of power supply units 10. In step S304, the surplus power supply unit determination unit 2080 determines whether the repetition condition is fulfilled. When the repetition condition is fulfilled, the process of FIG. 12 proceeds to step S306. On the other hand, when the repetition condition is not fulfilled, the process of FIG. 12 is terminated.

In step S306, the surplus power supply unit determination unit 2080 determines whether a conditional expression of "S[j].sup>0" is fulfilled. When this condition is fulfilled (YES in step S306), the process of FIG. 12 proceeds to step S308. On the other hand, when the condition is not fulfilled (NO in step S306), the process of FIG. 12 proceeds to step S310.

In step S308, the surplus power supply unit determination unit 2080 adds S[j] to a set SS of the surplus power supply units. In step S310, the surplus power supply unit determination unit 2080 adds 1 to the counter j. Since step S312 is a terminus of the loop process B, the process of FIG. 12 proceeds to step S304.

Each of the power supply units 10 which are in the set SS after the process of FIG. 12 described above is terminated is a surplus power supply unit.

<<Case where Energy is Specified for Each Accepting Condition>>

As described above, when the energy is determined for each of the accepting conditions, S[j].sup[C[i]] is used instead of S[j].sup in each expression of FIG. 9. In this case, in FIG. 12, the conditional expression in step S306 is replaced by the following Conditional Expression (9).

$$\sum_i S[j].sup[C[i]] > 0 \qquad (9)$$

<Details of Arbitrary Power Receiving Unit Determination Unit 2100>

Figure 13:
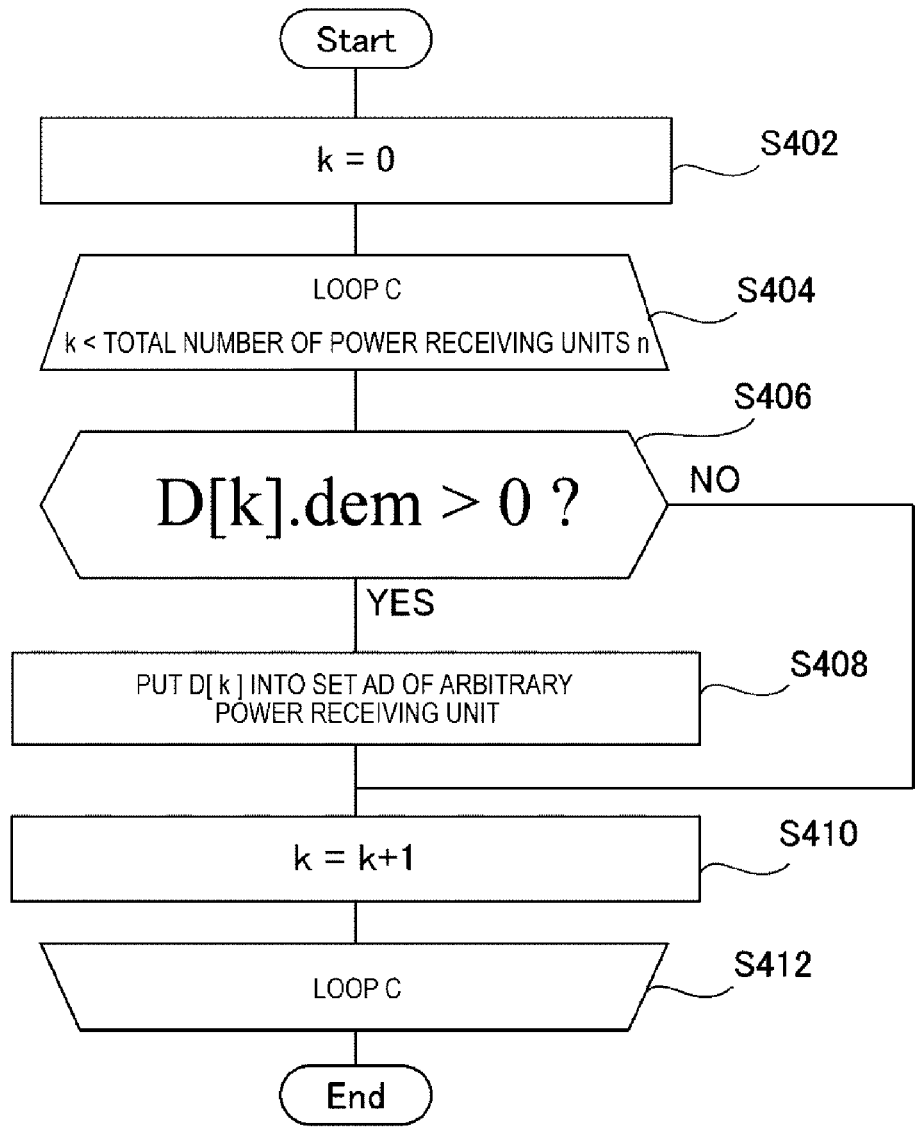
FIG. 13 is a flow diagram illustrating a flow of processes executed by an arbitrary power receiving unit determination unit.

A process performed by the arbitrary power receiving unit determination unit 2100 will be described in detail with reference to FIG. 13. FIG. 13 is a flow diagram illustrating a flow of processes executed by the arbitrary power receiving unit determination unit 2100. The process of FIG. 13 is obtained by detailing the process which is performed in step S110 of FIG. 4.

In step S402, the arbitrary power receiving unit determination unit 2100 sets a counter k to 0. Steps S404 to S412 are a loop process C executed while a repetition condition of "k<n" is fulfilled. Here, n is the total number of power receiving units 20. In step S404, the arbitrary power receiving unit determination unit 2100 determines whether the repetition condition is fulfilled. When the repetition condition is fulfilled, the process of FIG. 13 proceeds to step S406. On the other hand, when the repetition condition is not fulfilled, the process of FIG. 13 is terminated.

In step S406, the arbitrary power receiving unit determination unit 2100 determines whether a conditional expression of "D[k].dem>0" is fulfilled. When this condition is fulfilled (YES in step S406), the process of FIG. 13 proceeds to step S408. On the other hand, when the condition is not fulfilled (NO in step S406), the process of FIG. 13 proceeds to step S410.

In step S408, the arbitrary power receiving unit determination unit 2100 adds D[k] to a set AD of arbitrary power receiving units. In step S410, the arbitrary power receiving unit determination unit 2100 adds 1 to the counter k. Since step S412 is a terminus of the loop process C, the process of FIG. 13 proceeds to step S404.

Each of the power receiving units 20 which are in the set AD after the process of FIG. 13 described above is terminated is a surplus power supply unit.

<<Case where Energy is Specified for Each Accepting Condition>>

As described above, when the energy is determined for each of the accepting conditions, D[k].dem[C[i]] is used instead of D[k].dem in each expression of FIG. 9. In this case, in FIG. 13, the conditional expression in step S406 is replaced with the following Conditional Expression (10).

$$\sum_i D[k].dem[C[i]] > 0 \qquad (10)$$

<Others>

For example, the power distribution determination apparatus 2000 performs the first matching, the determination of the arbitrary power receiving unit, and the determination of the surplus power supply unit, for each time zone such as every hour or every day. Here, the power distribution determination apparatus 2000 may perform the first matching or the like in advance for a plurality of time zones, and may perform the first matching or the like every time. When the first matching or the like is performed in advance for a plurality of time zones, the power distribution determination apparatus 2000 acquires the supply information and the demand information for each time zone. For example, the power distribution determination apparatus 2000 acquires the demand information and the supply information for every hour of the next day during the night. The first matching, the determination of an arbitrary power receiving unit, and the determination of a surplus power supply unit are performed for every hour of the next day. Meanwhile, the power distribution determination apparatus 2000 may execute the first matching or the like at irregular timings.

Here, generally, in the retailing of power or the like, the distribution of power is often determined in units of a day or a month. However, power supplied from a power generation apparatus or the like and power used by a consumer may fluctuate in a short period of time such as in units of an hour. According to the present exemplary embodiment, the first matching or the like is performed using the demand information and the supply information at a short time interval such as an hour as described above, thereby allowing the distribution of power to be performed while considering such fluctuation.

Exemplary Embodiment 2

Figure 14:
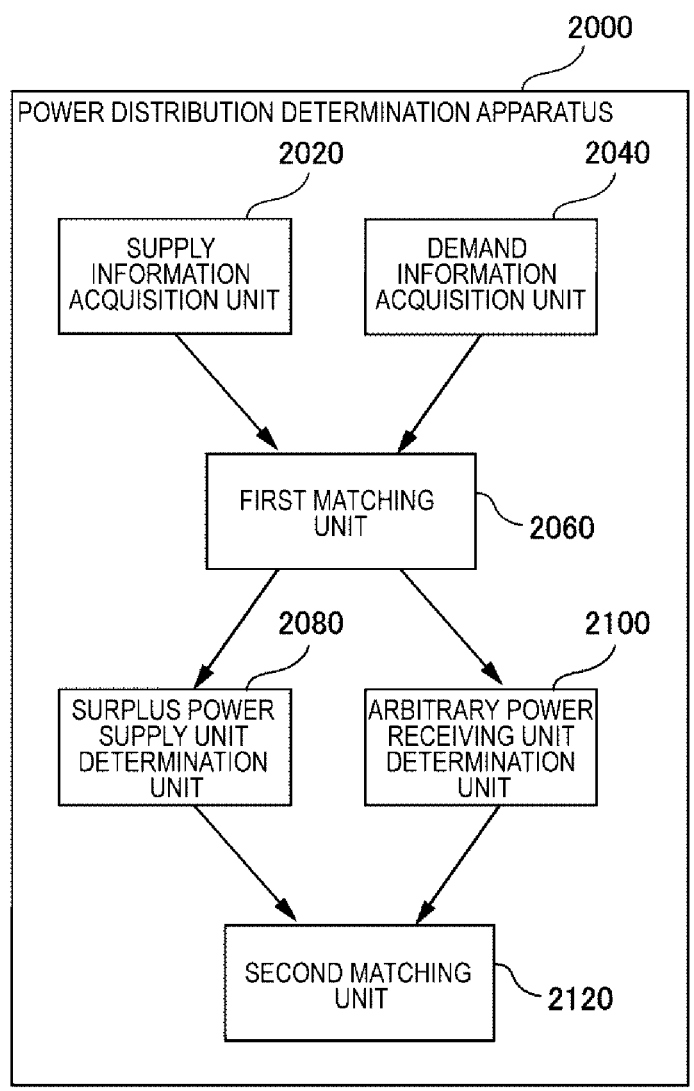
FIG. 14 is a block diagram illustrating a power distribution determination apparatus according to Exemplary Embodiment 2.

FIG. 14 is a block diagram illustrating a power distribution determination apparatus 2000 according to Exemplary Embodiment 2. In FIG. 14, arrows indicate a flow of information. Further, in FIG. 14, each block represents a function-based block rather than a hardware-based configuration.

The power distribution determination apparatus 2000 according to Exemplary Embodiment 2 includes a second matching unit 2120. The second matching unit 2120 performs second matching. The second matching is a process of determining one or a plurality of surplus power supply units that supply power to each of the arbitrary power receiving units so as to fulfill the demand energy of each of the arbitrary power receiving units.

The second matching unit 2120 determines "1) from which surplus power supply unit 2) what amount of energy is supplied 3) to which arbitrary power receiving unit". This process is equivalent to the process of determining each E[S[j]][D[k]] in the first matching. Therefore, the second matching unit 2120 can determine "1) from which surplus power supply unit 2) what amount of energy is supplied 3) to which arbitrary power receiving unit", using the same method as the method in which each E[S[j]][D[k]] is determined by the first matching unit 2060.

The second matching is different from the first matching, in that a target power receiving unit 20 is the arbitrary power receiving unit, and that any surplus power supply unit can be used regardless of the accepting condition. For this reason, even the power receiving unit 20 in which a portion or the entirety of the demand energy has not been fulfilled in the first matching receives a supply of power from the power supply unit 10. However, when demand exceeds supply, a portion or the entirety of the demand energy of one or more arbitrary power receiving units is not fulfilled. In addition, when supply exceeds demand, a portion or the entirety of the supply energy of one or more surplus power supply units is not used.

<Flow of Processes>

Figure 15:
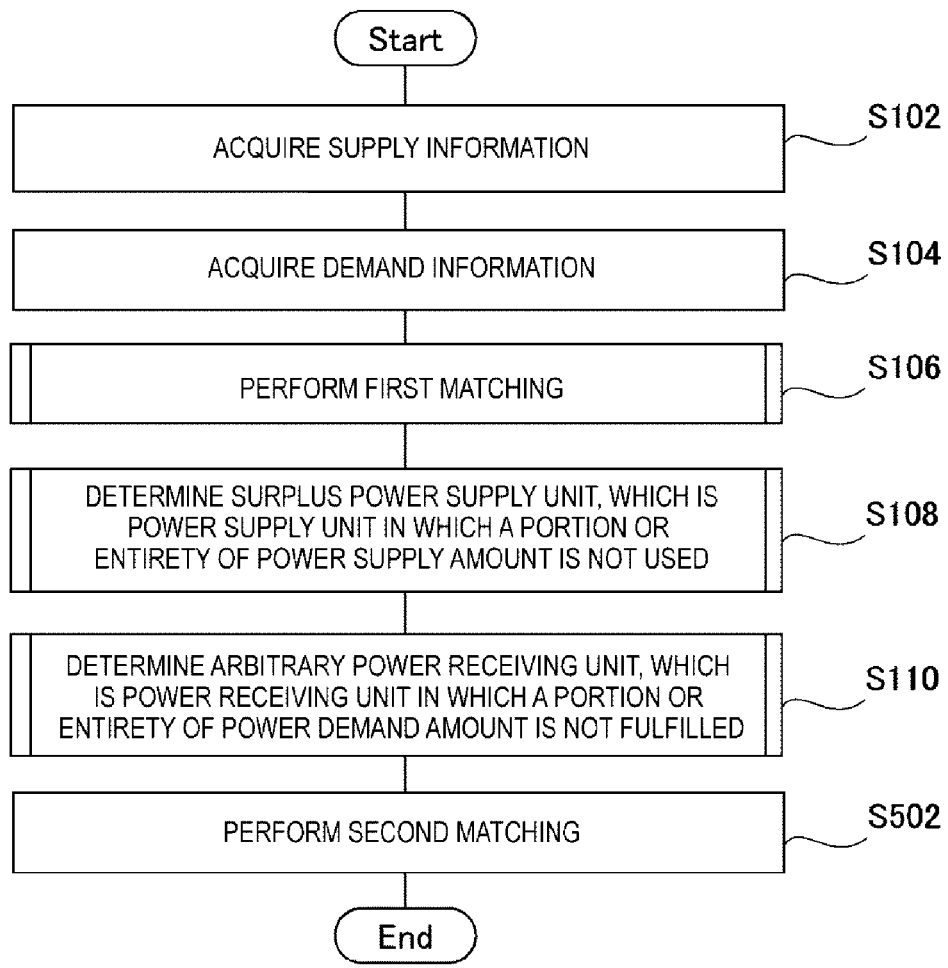
FIG. 15 is a flow diagram illustrating a flow of processes executed by the power distribution determination apparatus according to Exemplary Embodiment 2.

FIG. 15 is a flow diagram illustrating a flow of processes executed by the power distribution determination apparatus 2000 according to Exemplary Embodiment 2. The power distribution determination apparatus 2000 according to Exemplary Embodiment 2 executes steps S102 to S110 described in the power distribution determination apparatus 2000 according to Exemplary Embodiment 1, and then executes step S502. In step S502, the second matching unit 2120 performs the second matching.

Meanwhile, as described above, there are various timings at which the power distribution determination apparatus 2000 performs the first matching: the determination of a surplus power supply unit; and the determination of the arbitrary power receiving unit. Therefore, the second matching is similarly executed at these various timings.

<Operation and Effects>

According to the present exemplary embodiment, the supply energy of each of the power supply units 10 in which the supply energy remains in the first matching is allocated to each of the power receiving units 20 in which the demand energy has not been fulfilled in the first matching. In this manner, as much supply power as possible can be supplied to the power receiving unit 20 while recognizing "under the restriction such as the fulfillment of the accepting conditions, 1) which power supply unit 20 was not able to receive a supply of power as desired, and 2) in which power supply unit 10 the supply energy remains".

Exemplary Embodiment 3

Figure 16:
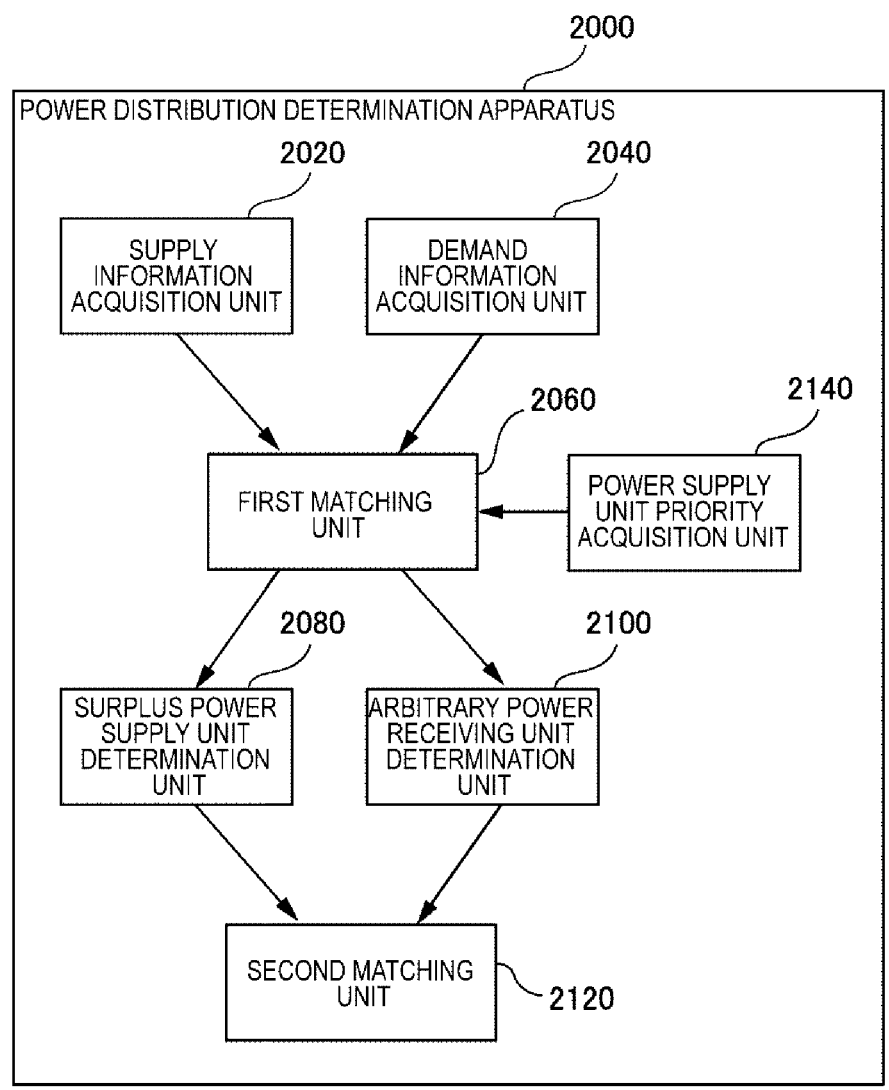
FIG. 16 is a block diagram illustrating a power distribution determination apparatus according to Exemplary Embodiment 3.

FIG. 16 is a block diagram illustrating a power distribution determination apparatus 2000 according to Exemplary Embodiment 3. In FIG. 16, arrows indicate a flow of information. Further, in FIG. 16, each block represents a function-based block rather than a hardware-based configuration.

The first matching unit 2060 according to Exemplary Embodiment 3 performs the first matching so as to fulfill the accepting conditions of each of the power receiving units 20 preferentially using the power supply unit 10 having high priority. For that reason, the power distribution determination apparatus 2000 according to Exemplary Embodiment 3 includes a power supply unit priority acquisition unit 2140 that acquires the priority of each of the power supply units 10.

As described above, when supply exceeds demand (NO in step S216 of FIG. 9), there is a power supply unit 10 in which a portion or the entirety of the supply energy is not used. When selecting the power supply unit 10 in which a portion or the entirety of the supply energy is not used, the first matching unit 2060 of the present exemplary embodiment preferentially selects a power supply unit 10 having low priority. For example, in step S220 of FIG. 9, the first matching unit 2060 sorts the power supply units 10 included in the set S in the ascending order of priority, and excludes the power supply units in order from the supply energy of the leading power supply unit 10, so that Conditional Expression (6) is fulfilled.

<Operation and Effects>

According to the present exemplary embodiment, priority can be given to the power supply units 10. Therefore, high priority is given to a power supply unit 10 which is desired to be used preferentially, thereby allowing the power supply unit 10 to be used preferentially. For example, an operation is considered in which the priority of the power supply unit 10 that supplies much power is made to be higher on the basis of past operational performance.

Exemplary Embodiment 4

Figure 17:
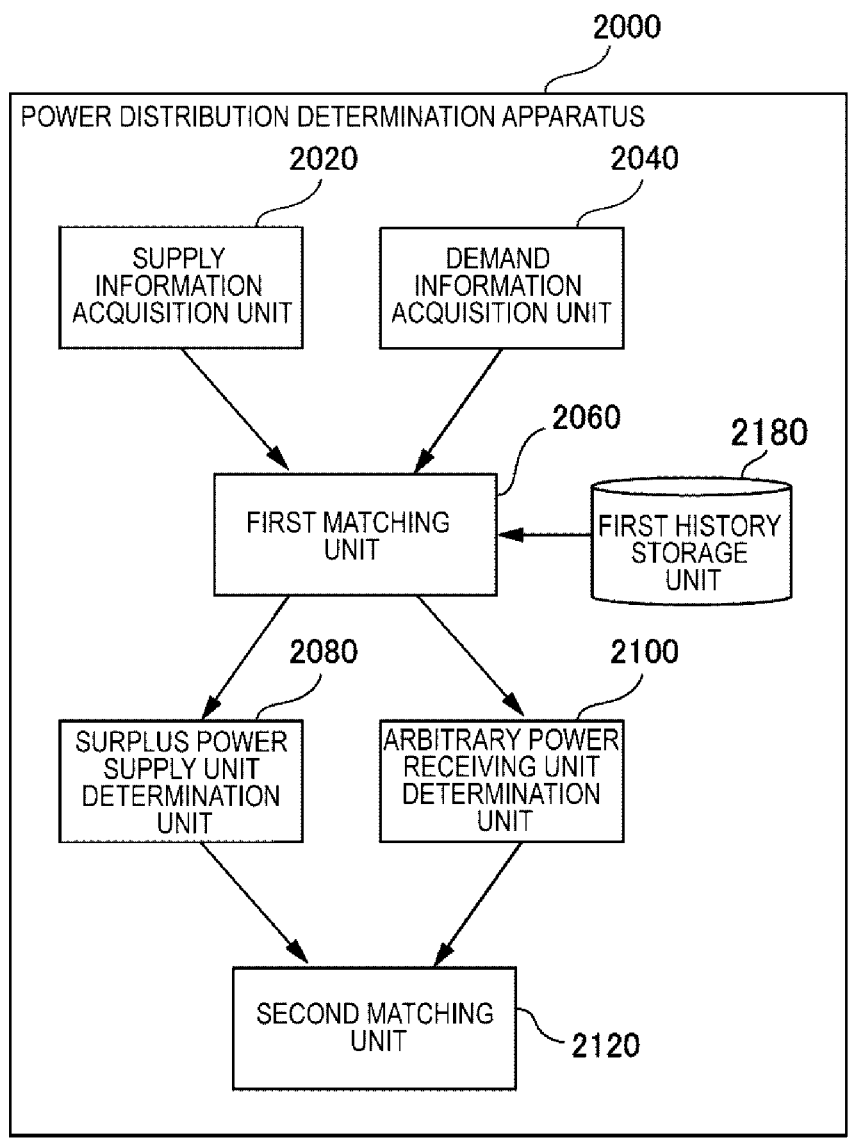
FIG. 17 is a block diagram illustrating a power distribution determination apparatus according to Exemplary Embodiment 4.

FIG. 17 is a block diagram illustrating a power distribution determination apparatus 2000 according to Exemplary Embodiment 4. In FIG. 17, arrows indicate a flow of information. Further, in FIG. 17, each block represents a function-based block rather than a hardware-based configuration.

The power distribution determination apparatus 2000 according to Exemplary Embodiment 4 performs the first matching using a power supply unit 10 preferentially in which a portion or the entirety of the supply energy has not been used in the previous first matching. For that reason, the power distribution determination apparatus 2000 according to Exemplary Embodiment 4 includes a first history storage unit 2180. The first history storage unit 2180 stores the power supply unit 10 in which a portion or the entirety of the supply energy has not been used in the first matching. Here, as described above, the power supply unit 10 in which a portion or the entirety of the supply energy has not been fulfilled in the first matching is equivalent to a surplus power supply unit. Therefore, the first history storage unit 2180 can also be represented as the history of the power supply unit 10 determined as a surplus power supply unit.

The first matching unit 2060 gives high priority to the power supply unit 10 stored in the first history storage unit 2180 in the previous first matching, and performs the same process as that of the first matching unit 2060 according to Exemplary Embodiment 4.

FIG. 18 is a diagram illustrating information stored in the first history storage unit 2180 in a table form. A table shown in FIG. 18 is denoted as a first history table 400. The first history table 400 has two columns for a first matching ID 402 and a power supply unit 404. The first matching ID 402 is an ID which is allocated to the first matching, and, for example, indicates how many times the first matching has been performed. For example, in FIG. 18, records in a first row indicate a history generated in the first matching performed on the tenth time, and records in a second row indicate a history generated in the first matching performed on the ninth time. The power supply unit 404 indicates an ID of the power supply unit 10 in which a portion or the entirety of the supply energy has not been used.

The first history table 400 shown in FIG. 18 stores the power supply unit 10 in which a portion or the entirety of the supply energy has not been used in each of multiple, past first matchings. For example, in this case, the first matching unit 2060 gives higher priority to the power supply unit 10 having a larger number of times by which a portion or the entirety of the supply energy has not been used. Meanwhile, in this case, the first matching unit 2060 can also, for example, "use the history of a predetermined number of times in the past" without using all the stored histories. However, the first history storage unit 2180 may store only the latest history.

Figure 19:
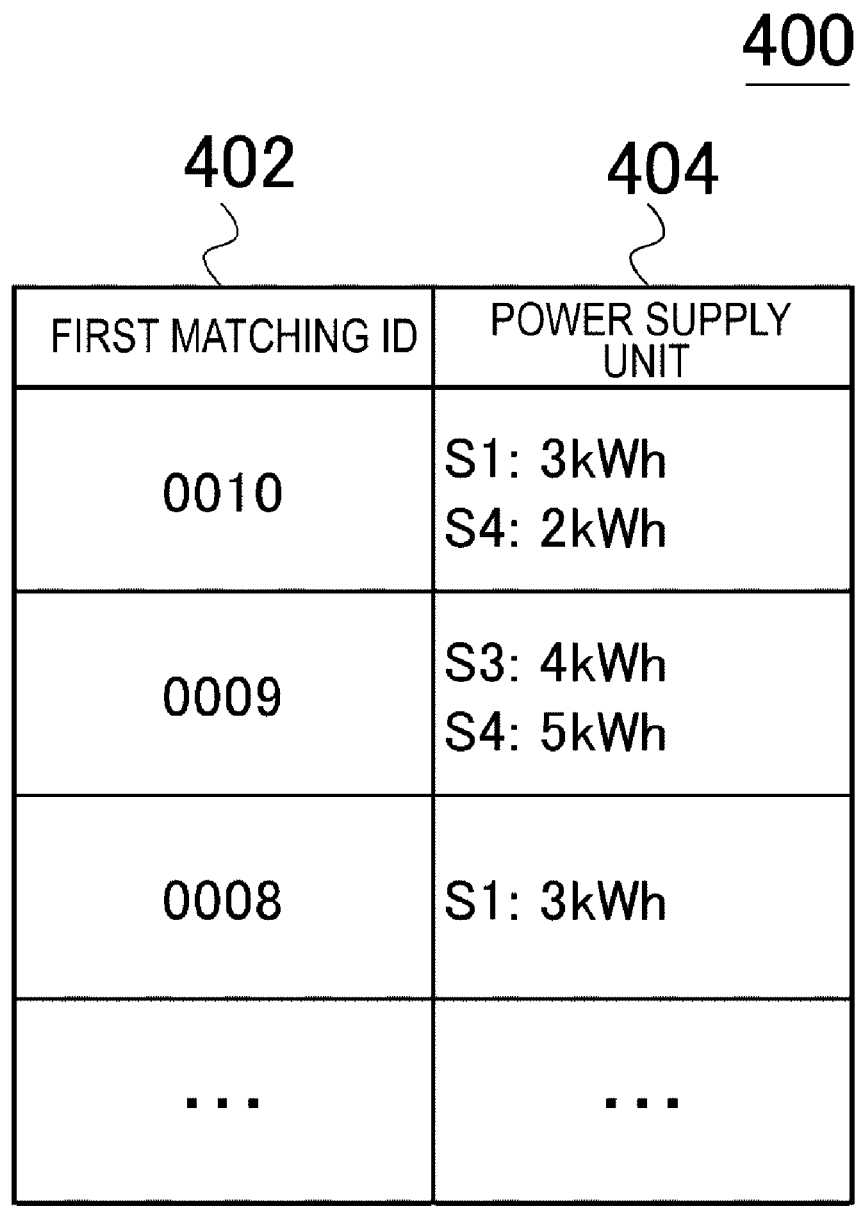
FIG. 19 is a diagram illustrating information stored in the first history storage unit, in a table form.

In addition, as shown in FIG. 19, the first history storage unit 2180 may indicate "in which power supply unit 10 and to what extent the supply energy has not been used" in each of the multiple past first matchings. A power supply unit 404 of FIG. 19 indicates the energy which has not been used in the power supply unit 10 in which a portion or the entirety of the supply energy has not been used.

For example, the first matching unit 2060 gives higher priority to the power supply unit 10 having a larger total of the energy which has not been used. Considering the past three times shown in FIG. 19, the first matching unit 2060 sets the priority of a power supply unit S4 to be highest, sets the priority of a power supply unit S1 to be second highest, and sets the priority of a power supply unit S3 to be third highest.

<Operation and Effects>

According to the present exemplary embodiment, the first matching is performed by preferentially using the power supply unit 10 in which a portion or the entirety of the supply energy has not been used in the previous first matching. Therefore, it is possible to increase equity between the power supply units 10.

Exemplary Embodiment 5

Figure 20:
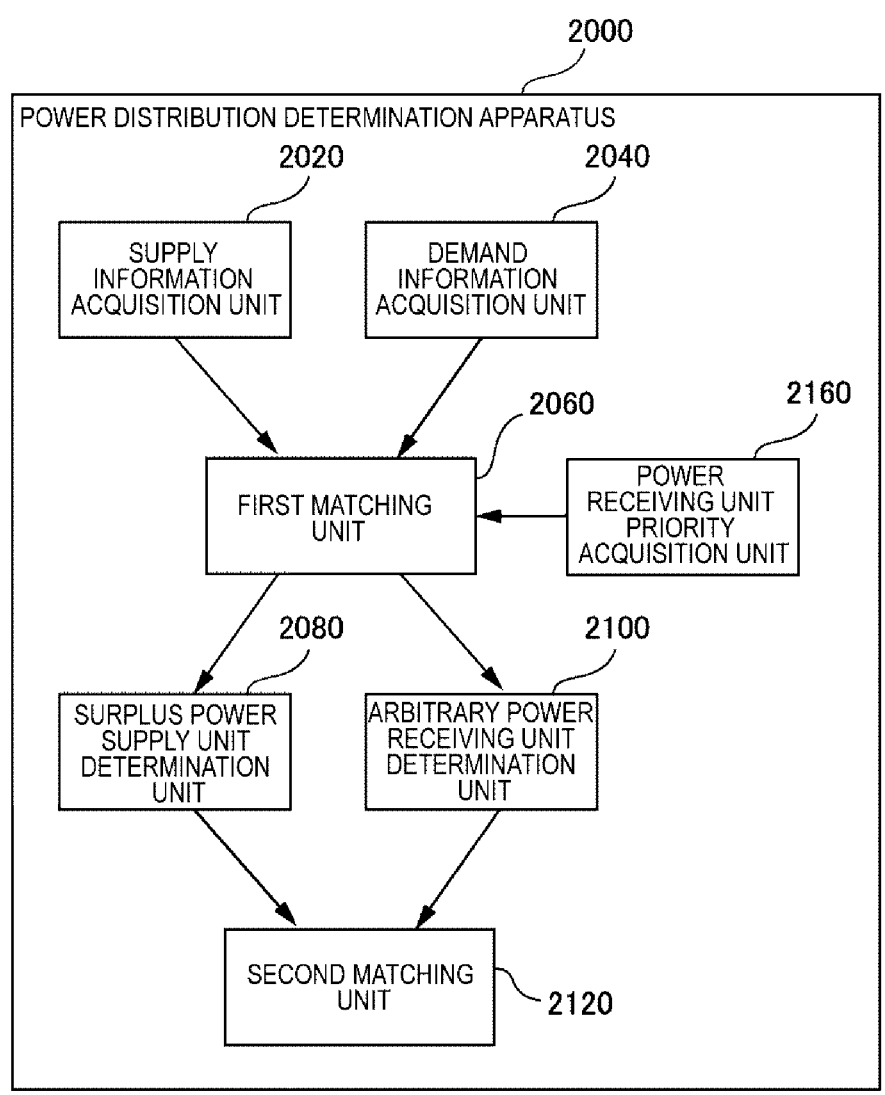
FIG. 20 is a block diagram illustrating a power distribution determination apparatus according to Exemplary Embodiment 5.

FIG. 20 is a block diagram illustrating a power distribution determination apparatus 2000 according to Exemplary Embodiment 5. In FIG. 20, arrows denote a flow of information. Further, in FIG. 20, each block represents a function-based block rather than a hardware-based configuration.

The first matching unit 2060 according to Exemplary Embodiment 5 performs the first matching so as to preferentially fulfill the accepting conditions of the power receiving unit 20 having high priority. For that reason, the power distribution determination apparatus 2000 according to Exemplary Embodiment 6 includes a power receiving unit priority acquisition unit 2160 that acquires the priority of each of the power receiving units 20.

As described above, when demand exceeds supply (YES in step S216 of FIG. 9), there is a power receiving unit 20 in which a portion or the entirety of the demand energy is not fulfilled. When selecting the power receiving unit 20 in which a portion or the entirety of the demand energy is not fulfilled, the first matching unit 2060 of the present exemplary embodiment preferentially selects a power receiving unit 20 having low priority. For example, in step S218 of FIG. 9, the first matching unit 2060 sorts the power receiving units 20 included in the set D in the ascending order of priority, and excludes the power receiving units in order from the demand energy of the leading power receiving unit 20, so that Conditional Expression (5) is fulfilled.

<Operation and Effects>

According to the present exemplary embodiment, priority can be given to the power receiving unit 20. Therefore, high priority is given to a power receiving unit 20 which is desired to be used preferentially, thereby allowing the power receiving unit 20 to be used preferentially. For example, an operation is considered in which the priority of the power receiving unit 20 that uses much power is made to be higher on the basis of past operational performance.

Exemplary Embodiment 6

Figure 21:
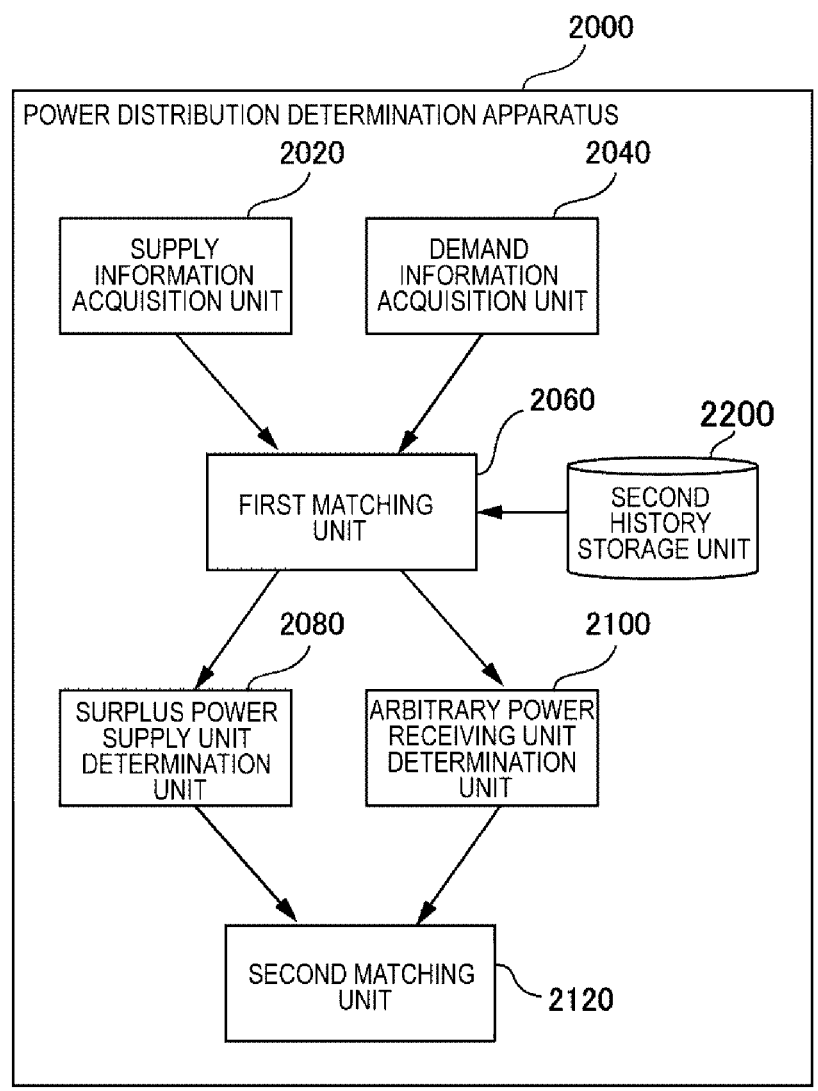
FIG. 21 is a block diagram illustrating a power distribution determination apparatus according to Exemplary Embodiment 6.

FIG. 21 is a block diagram illustrating a power distribution determination apparatus 2000 according to Exemplary Embodiment 6. In FIG. 21, arrows indicate a flow of information. Further, in FIG. 21, each block represents a function-based block rather than a hardware-based configuration.

The power distribution determination apparatus 2000 according to Exemplary Embodiment 6 performs the first matching preferentially using a power receiving unit 20 in which a portion or the entirety of the demand energy has not been fulfilled in the previous first matching. For that reason, the power distribution determination apparatus 2000 according to Exemplary Embodiment 6 includes a second history storage unit 2200. The second history storage unit 2200 stores the power receiving unit 20 in which a portion or the entirety of the demand energy has not been fulfilled. Here, as described above, the power receiving unit 20 in which a portion or the entirety of the demand energy has not been fulfilled in the first matching is equivalent to the arbitrary power receiving unit. Therefore, the second history storage unit 2200 can also be represented as the history of the power receiving unit 20 determined as an arbitrary power receiving unit.

For example, the first matching unit 2060 gives high priority to the power receiving unit 20 stored in the second history storage unit 2200 in the previous first matching, and performs the same process as that of the first matching unit 2060 according to Exemplary Embodiment 5.

Figure 22:
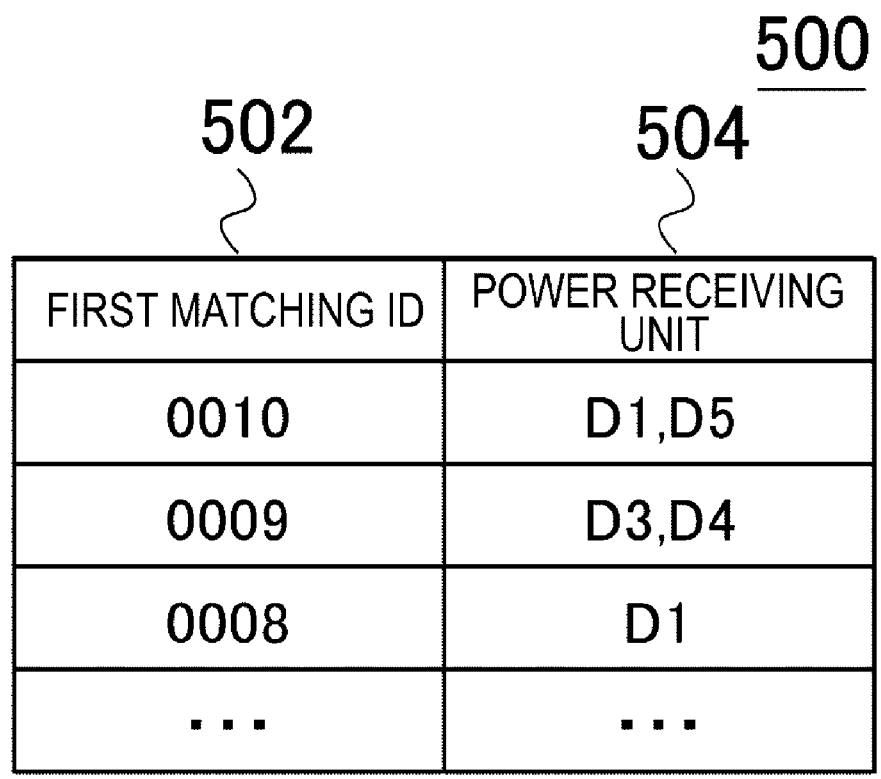
FIG. 22 is a diagram illustrating information stored in a second history storage unit, in a table form.

FIG. 22 is a diagram illustrating information which is stored in the second history storage unit 2200 in a table form. A table shown in FIG. 22 is denoted as a second history table 500. The second history table 500 has two columns for a first matching ID 502 and a power receiving unit 504. Contents indicated by the first matching ID 502 are the same as contents indicated by the first matching ID 402 of FIG. 18. The power receiving unit 504 indicates an ID of the power receiving unit 20 in which a portion or the entirety of the demand energy has not been fulfilled.

The second history table 500 shown in FIG. 22 stores the power receiving unit 20 in which a portion or the entirety of the demand energy has not been fulfilled in each of the multiple past first matchings. For example, in this case, the first matching unit 2060 gives higher priority to the power receiving unit 20 having a larger number of times by which a portion or the entirety of the demand energy has not been fulfilled. Meanwhile, in this case, the first matching unit 2060 can also, for example, "use the history of a predetermined number of times in the past" without using all the stored histories. However, the second history storage unit 2200 may store only the latest history.

In addition, as shown in FIG. 23, the second history storage unit 2200 may indicate "in which power supply unit 20 and to what extent the demand energy has not been fulfilled" in each of the past multiple first matchings. A power receiving unit 504 of FIG. 23 indicates the energy which has not been fulfilled in the power receiving unit 20 in which a portion or the entirety of the demand energy has not been fulfilled.

For example, the first matching unit 2060 gives higher priority to the power receiving unit 20 having a larger total of the energy which has not been fulfilled. Considering the three past times of FIG. 23, the first matching unit 2060 sets the priority of a power supply unit D4 to be highest, sets the priority of a power receiving unit D1 to be second highest, and sets the priority of the power receiving unit D3 to be third highest.

<Operation and Effects>

According to the present exemplary embodiment, the first matching is performed by preferentially using the power receiving unit 20 in which a portion or the entirety of the demand energy has not been fulfilled in the previous first matching. Therefore, it is possible to increase equity between the power receiving units 20.

Exemplary Embodiment 7

Figure 24:
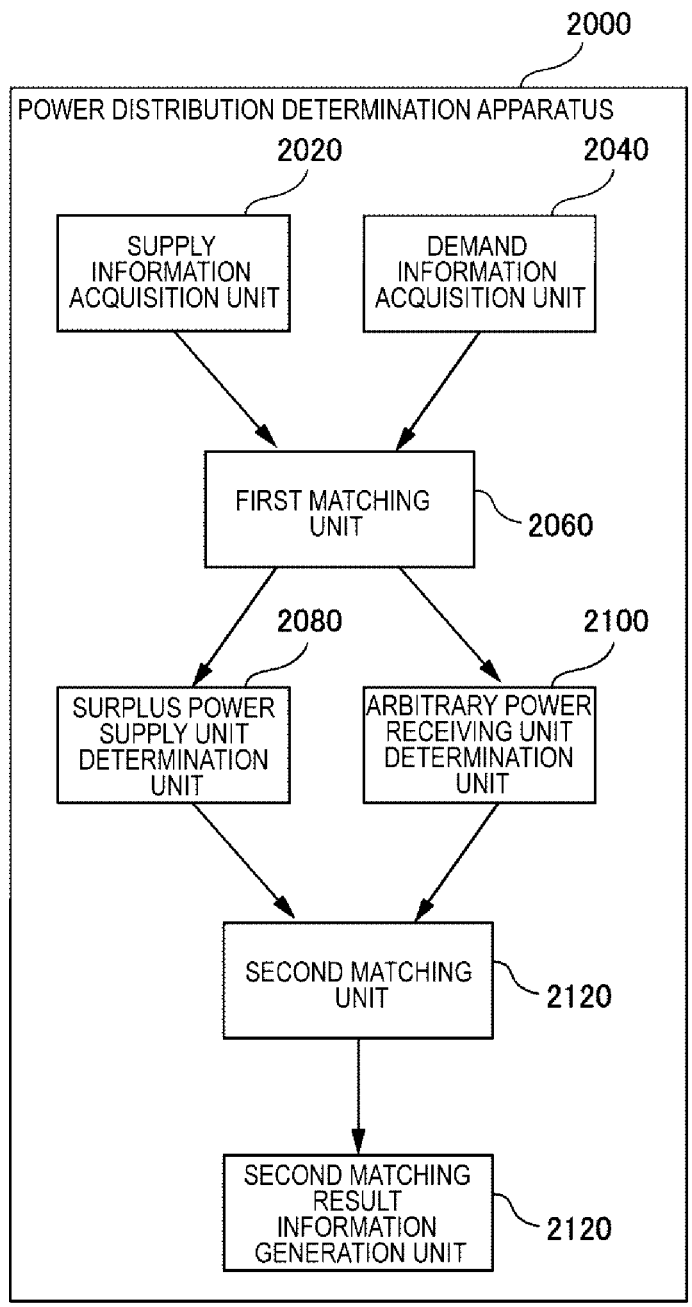
FIG. 24 is a block diagram illustrating a power distribution determination apparatus according to Exemplary Embodiment 7.

FIG. 24 is a block diagram illustrating a power distribution determination apparatus 2000 according to Exemplary Embodiment 7. In FIG. 24, arrows indicate a flow of information. Further, in FIG. 24, each block represents a function-based block rather than a hardware-based configuration.

The power distribution determination apparatus 2000 according to Exemplary Embodiment 7 includes a second matching result information generation unit 2220 that generates second matching result information. The second matching result information is information indicating a combination of "an arbitrary power receiving unit and a surplus power supply unit that supplies power to the arbitrary power receiving unit". Here, as described in Exemplary Embodiment 1, the arbitrary power receiving unit is a power receiving unit 20 in which a portion or the entirety of the demand energy has not been fulfilled in the first matching. In addition, the surplus power supply unit is a power supply unit 10 in which a portion or the entirety of the supply energy has not been used in the first matching.

Figure 25:
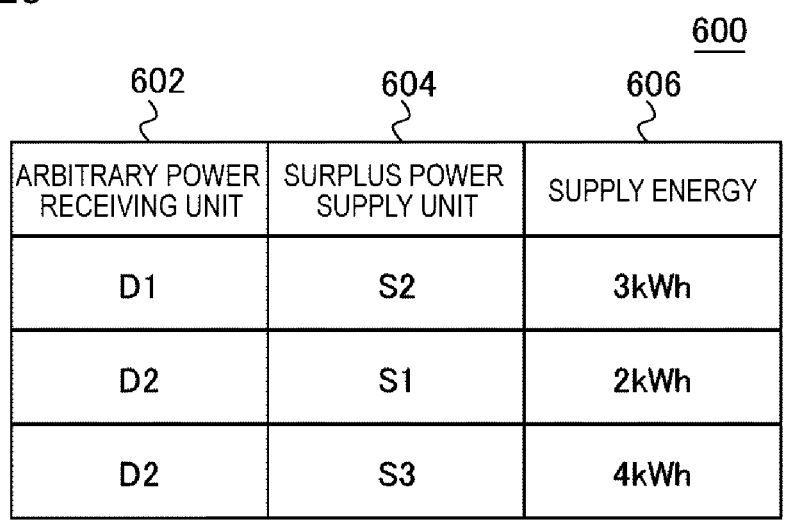
FIG. 25 is a diagram illustrating second matching result information in a table form.

FIG. 25 is a diagram illustrating the second matching result information in a table form. A table shown in FIG. 25 is denoted as a second matching result table 600. The second matching result table 600 has three columns for an arbitrary power receiving unit 602, a surplus power supply unit 604, and a supply energy 606. Each record of the second matching result table 600 indicates that in the second matching, energy shown in the supply energy 606 are allocated to the power receiving unit 20 shown in the arbitrary power receiving unit 602, from the power supply unit 10 shown in the surplus power supply unit 604.

<Operation and Effects>

According to the present exemplary embodiment, the second matching result information indicating a combination of "an arbitrary power receiving unit and a surplus power supply unit that supplies power to the arbitrary power receiving unit" is generated. For example, the second matching result information is provided to a consumer who possesses the power receiving unit 20. The consumer can understand "how much power is supplied in a desired condition", and "from which power supply unit 10 power which has not been supplied in the desired condition is supplied", with respect to the power receiving unit 20 possessed by the consumer. Further, as shown in FIG. 25, in the second matching result information, when the energy supplied from a surplus power supply unit is indicated, the consumer can understand a breakdown regarding from which power supply unit 10 and how much the power not supplied in the desired condition has been supplied. The consumer can use the acquired information as a reference for selecting an electric power company or the like to use in the future.

Figure 26:
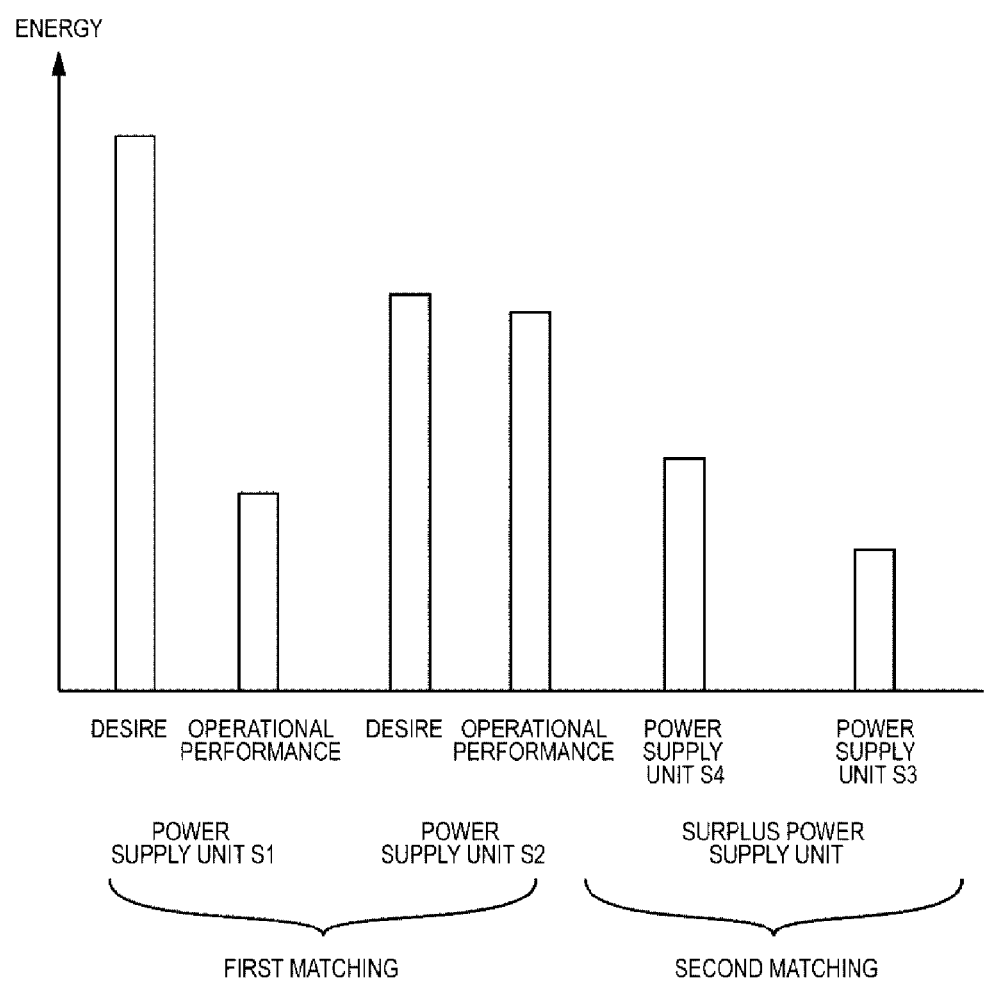
FIG. 26 is a diagram illustrating information provided to a consumer.

FIG. 26 is a diagram illustrating information provided to a consumer. FIG. 26 shows how much supply of power which is consistent with a desire in the first matching was performed (first matching), and where the energy not consistent with the desire was supplied from (second matching). A consumer views a result of the second matching, and thus can recognize from which power supply unit the power which has not been supplied as desired has been obtained. In addition, a consumer views a result of the first matching, and thus can understand that the supply of power conforming to the desire was not able to be received from the power supply unit S1, and that the supply of power was able to be received substantially as desired from the power supply unit S2.

In addition, for example, an electric power company or the like which possesses a certain surplus power supply unit is provided with the second matching result information indicating the surplus power supply unit. Thereby, the electric power company or the like can understand that a power supply unit 10 possessed by the company is used in the supply of power to a power receiving unit 20 that does not desire the power supply unit 10. For example, when the electric power company or the like can understand that the possessed power supply unit 10 is often handled as a surplus power supply unit, the company can recognize that "the possessed power supply unit 10 is not preferable from the viewpoint of a consumer". For this reason, the electric power company or the like can recognize that there is a need for an improvement in the power supply unit 10 possessed by the companies.

Further, for example, an electric power company or the like is assumed to include multiple kinds of power sources. For example, the multiple kinds of power sources are assumed to be different from each other in a power generation method, cost, and the like. In this case, the electric power company or the like recognizes what kind of power source is used as a surplus power supply unit, and thus can recognize "what kind of power source is preferable for a consumer", "to what extent the cost of the power supply unit 10 is acceptable for a consumer", and the like. Thus, the electric power company or the like uses the second matching result information, and thus can efficiently establish a business project considering an improvement measure regarding cost or the type of power source to be expanded from now on. Meanwhile, in this case, the power distribution determination apparatus 2000 manages the allocation of power in the first matching or the second matching for each type of power source. In Exemplary Embodiment 1, a method of managing the supply energy of each power supply unit $S[j]$ for each reference $C[i]$ (method of using $S[j].sup[C[i]]$) is illustrated. According to this method, the power distribution determination apparatus 2000 can recognize the energy which has been used in each of the power supply units 10 for each condition such as the type of power source.

Figure 27:
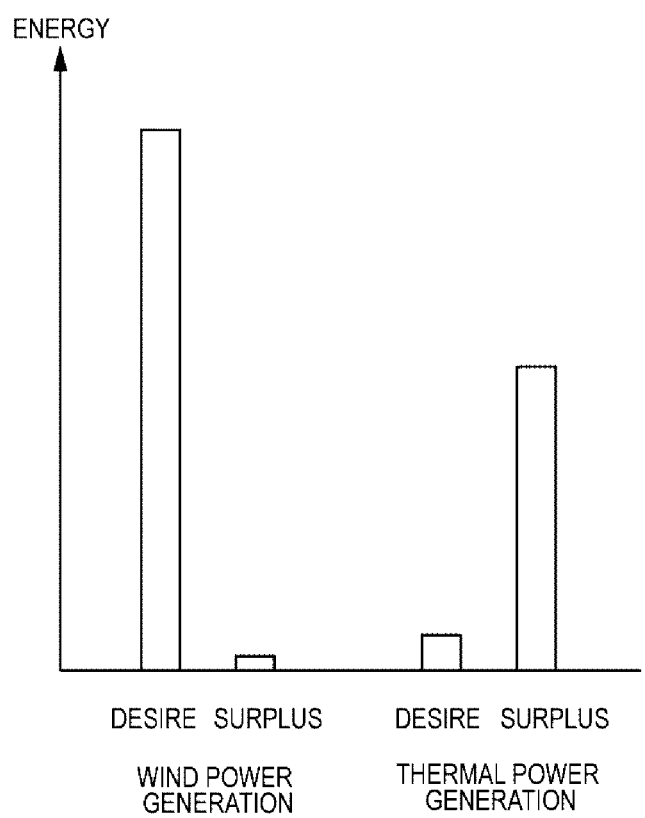
FIG. 27 is a diagram illustrating information provided to an electric power company.

FIG. 27 is a diagram illustrating information provided to a certain electric power company. In this example, the electric power company has a power source for wind power generation and a power source for thermal power generation. In FIG. 27, a graph shown by "desire" is power used in the first matching, and is power used according to the desire of the power receiving unit 20. On the other hand, a graph shown by "surplus" is power used in the second matching, and is power used to make up for a shortage with respect to the power receiving unit 20 to which power has not been supplied as desired.

Referring to FIG. 27, wind power generation has a high percentage of "desire", and thermal power generation has a high percentage of "surplus". From this, an electric power company can understand that "wind power generation is preferable for a consumer", and that "thermal power generation is not preferable for a consumer". For this reason, for example, this electric power company can establish a business project to be increasingly expanded with focus on a power source for wind power generation in the future.

As described above, although the exemplary embodiments of the present invention have been set forth with reference to the accompanying drawings, they are merely illustrative of the present invention, and various configurations other than those stated above can be adopted.

Hereinafter, examples of reference forms are appended.

(1) A power distribution determination apparatus that determines a distribution of power from a plurality of power supply units to a plurality of power receiving units, comprising:

a supply information acquisition unit that acquires supply information from each of the power supply units, the supply information indicating a supply energy, the supply energy being energy being able to be supplied or expected energy being able to be supplied from the power supply unit;

a demand information acquisition unit that acquires demand information from each of the power receiving units, the demand information indicating a demand energy and accepting conditions, the demand energy being a required energy or an expected required energy, the accepting condition being condition related to a power supply unit that accepts to supply power;

a first matching unit that performs first matching for determining one or a plurality of the power supply units that supply power to each of the power receiving units so as to fulfill the accepting conditions corresponding to each power receiving unit;

a surplus power supply unit determination unit that determines a surplus power supply unit by a result of the first matching, the surplus power supply unit being the power supply unit in which a portion or the entirety of the supply energy is not used; and an arbitrary power receiving unit determination unit that determines an arbitrary power receiving unit with a result of the first matching, the arbitrary power receiving unit being the power receiving unit in which a portion or the entirety of the demand energy is not fulfilled.

(2) The power distribution determination apparatus according to (1), further comprising a second matching unit that performs second matching for determining one or a plurality of the surplus power supply units that supply power to each of the arbitrary power receiving units so as to fulfill demand energy of each of the arbitrary power receiving units.

(3) The power distribution determination apparatus according to (1) or (2), wherein the supply information indicates an attribute of a corresponding power supply unit, and the accepting conditions indicated by the demand information include conditions for the attribute.

(4) The power distribution determination apparatus according to any one of (1) to (3), further comprising a power supply unit priority acquisition unit that acquires priority of each of the power supply units, wherein the first matching unit performs the first matching so as to fulfill the accepting conditions of each of the power receiving units, preferentially using the power supply unit having high priority.

(5) The power distribution determination apparatus according to any one of (1) to (4), further comprising a first history storage unit that stores the power supply unit in which a portion or the entirety of a supply energy has not been used in the first matching, wherein the first matching unit performs the first matching so as to fulfill the accepting conditions of each of the power receiving units, preferentially using the power supply unit stored in the first history storage unit in the previous first matching.

(6) The power distribution determination apparatus according to any one of (1) to (3), further comprising a power receiving unit priority acquisition unit that acquires priority of the power receiving unit, wherein the first matching unit performs the first matching so as to preferentially fulfill the accepting conditions of the power receiving unit having high priority.

(7) The power distribution determination apparatus according to any one of (1) to (3) and (6), further comprising a second history storage unit that stores the power receiving unit in which a portion or the entirety of demand energy has not been fulfilled in the first matching, wherein the first matching unit performs the first matching so as to preferentially fulfill the accepting conditions of the power receiving unit stored in the second history storage unit in the previous first matching.

(8) The power distribution determination apparatus according to (2), further comprising a second matching result information generation unit that generates second matching result information, the second matching result information being information indicating a combination of an arbitrary power receiving unit and a surplus power supply unit supplying power to the arbitrary power receiving unit.

(9) A control method executed by a computer that determines a distribution of power from a plurality of power supply units to a plurality of power receiving units, comprising:

a supply information acquisition step of acquiring supply information from each of the power supply units, the supply information indicating a supply energy, the supply energy being energy being able to be supplied or expected energy being able to be supplied from the power supply unit;

a demand information acquisition step of acquiring demand information from each of the power receiving units, the demand information indicating a demand energy and accepting conditions, the demand energy being a required energy or an expected required energy, the accepting condition being condition related to a power supply unit that accepts to supply power;

a first matching step of performing first matching for determining one or a plurality of the power supply units that supply power to each of the power receiving units so as to fulfill the accepting conditions corresponding to each power receiving unit;

a surplus power supply unit determination step of determining a surplus power supply unit with a result of the first matching, the surplus power supply unit being the power supply unit in which a portion or the entirety of the supply energy is not used; and an arbitrary power receiving unit determination step of determining an arbitrary power receiving unit with a result of the first matching, the arbitrary power receiving unit being the power receiving unit in which a portion or the entirety of the demand energy is not fulfilled.

(10) The control method according to (9), further comprising a second matching step of performing second matching for determining one or a plurality of the surplus power supply units that supply power to each of the arbitrary power receiving units so as to fulfill demand energy of each of the arbitrary power receiving units.

(11) The control method according to (9) or (10), wherein the supply information indicates an attribute of a corresponding power supply unit, and the accepting conditions indicated by the demand information include conditions for the attribute.

(12) The control method according to any one of (9) to (11), further comprising a power supply unit priority acquisition step of acquiring priority of each of the power supply units, wherein the first matching step performs the first matching so as to fulfill the accepting conditions of each of the power receiving units, preferentially using the power supply unit having high priority.

(13) The control method according to any one of (9) to (12), wherein the computer includes a first history storage unit that stores the power supply unit in which a portion or the entirety of supply energy has not been used in the first matching, and in the first matching step, the first matching is performed so as to fulfill the accepting conditions of each of the power receiving units, preferentially using the power supply unit stored in the first history storage unit in the previous first matching.

(14) The control method according to any one of (9) to (11), further comprising a power receiving unit priority acquisition step of acquiring priority of the power receiving unit, wherein in the first matching step, the first matching is performed so as to preferentially fulfill the accepting conditions of the power receiving unit having high priority.

(15) The control method according to any one of (9) to (11) and (14), wherein the computer includes a second history storage unit that stores the power receiving unit in which a portion or the entirety of demand energy has not been fulfilled in the first matching, and in the first matching step, the first matching is performed so as to preferentially fulfill the accepting conditions of the power receiving unit stored in the second history storage unit in the previous first matching.

(16) The control method according to (10), further comprising a second matching result information generation step of generating second matching result information, the second matching result information being information indicating a combination of an arbitrary power receiving unit and a surplus power supply unit supplying power to the arbitrary power receiving unit.

(17) A non-transitory computer-readable storage medium storing a program that causes a computer to have a function of determining a distribution of power from a plurality of power supply units to a plurality of power receiving units, the program causing the computer to execute:

a supply information acquisition function of acquiring supply information from each of the power supply units, the supply information indicating a supply energy, the supply energy being energy being able to be supplied or expected energy being able to be supplied from the power supply unit;

a demand information acquisition function of acquiring demand information from each of the power receiving units, the demand information indicating a demand energy and accepting conditions, the demand energy being a required energy or an expected required energy, the accepting condition being condition related to a power supply unit that accepts to supply power;

a first matching function of performing first matching for determining one or a plurality of the power supply units that supply power to each of the power receiving units so as to fulfill the accepting conditions corresponding to each power receiving unit;

a surplus power supply unit determination function of determining a surplus power supply unit with a result of the first matching, the surplus power supply unit being the power supply unit in which a portion or the entirety of the supply energy is not used; and an arbitrary power receiving unit determination function of determining an arbitrary power receiving unit with a result of the first matching, the arbitrary power receiving unit being the power receiving unit in which a portion or the entirety of the demand energy is not fulfilled.

(18) The non-transitory computer-readable storage medium according to (17), the program further causing the computer to execute a second matching function of performing second matching for determining one or a plurality of the surplus power supply units that supply power to each of the arbitrary power receiving units so as to fulfill demand energy of each of the arbitrary power receiving units.

(19) The non-transitory computer-readable storage medium according to (17) or (18), wherein the supply information indicates an attribute of a corresponding power supply unit, and the accepting conditions indicated by the demand information include conditions for the attribute.

(20) The non-transitory computer-readable storage medium according to any one of (17) to (19), the program causing the computer to execute a power supply unit priority acquisition function of acquiring priority of each of the power supply units, wherein in the first matching function, the first matching is performed so as to fulfill the accepting conditions of each of the power receiving units, preferentially using the power supply unit having high priority.

(21) The non-transitory computer-readable storage medium according to any one of (17) to (20), wherein the computer includes a first history storage unit that stores the power supply unit in which a portion or the entirety of supply energy has not been used in the first matching, and in the first matching function, the first matching is performed so as to fulfill the accepting conditions of each of the power receiving units, preferentially using the power supply unit stored in the first history storage unit in the previous first matching.

(22) The non-transitory computer-readable storage medium according to any one of (17) to (19), the program further causing the computer to execute a power receiving unit priority acquisition function of acquiring priority of the power receiving unit, wherein in the first matching function, the first matching is performed so as to preferentially fulfill the accepting conditions of the power receiving unit having high priority.

(23) The non-transitory computer-readable storage medium according to any one of (17) to (19) and (22), wherein the computer includes a second history storage unit that stores the power receiving unit in which a portion or the entirety of demand energy has not been fulfilled in the first matching, and in the first matching function, the first matching is performed so as to preferentially fulfill the accepting conditions of the power receiving unit stored in the second history storage unit in the previous first matching.

(24) The non-transitory computer-readable storage medium according to (18), the program further causing the computer to execute a second matching result information generation function of generating second matching result information, the second matching result information being information indicating a combination of an arbitrary power receiving unit and a surplus power supply unit supplying power to the arbitrary power receiving unit.

It is apparent that the present invention is not limited to the above exemplary embodiment, and may be modified and changed without departing from the scope and spirit of the invention.

What is claimed is:

1. A power distribution determination apparatus configured to distribute power from a plurality of power supply units to a plurality of power receiving units, the power distribution determination apparatus comprising:

a supply information acquisition unit configured to receive supply information from each of the power supply units, the supply information indicating a supply energy, the supply energy including energy or expected energy available for supply from the power supply unit;

a demand information acquisition unit configured to receive demand information from each of the power receiving units, the demand information indicating a demand energy and accepting conditions, the demand energy including a required energy or an expected required energy for each of the power receiving units, the accepting conditions being conditions associated with a power supply unit selected to supply power;

a first matching unit configured to perform a first matching for determining a first one or a first plurality of the power supply units for supplying power to each of the power receiving units so as to fulfill the accepting conditions corresponding to each power receiving unit;

a surplus power supply determination unit configured to identify a plurality of surplus power supply units based on the first matching, the plurality of surplus power supply units being the power supply units in which a portion or an entirety of the supply energy is not used;

an arbitrary power receiving determination unit that determines a plurality of arbitrary power receiving units based on the first matching, the plurality of arbitrary power receiving units being the power receiving units in which a portion or an entirety of the demand energy is not fulfilled; and a second matching unit configured to perform a second matching for determining a second one or a second plurality of the surplus power supply units for supplying power to each of the arbitrary power receiving units to fulfill the demand energy of each of the arbitrary power receiving units, wherein the power distribution determination apparatus is configured to control a power distribution apparatus to distribute the power from the power supply units to the power receiving units based on the first matching and the second matching.

2. The power distribution determination apparatus according to claim 1, wherein the supply information indicates an attribute of a corresponding power supply unit, and the accepting conditions indicated by the demand information include conditions for the attribute.

3. The power distribution determination apparatus according to claim 1, further comprising a power supply unit priority acquisition unit that acquires priority of each of the power supply units, wherein the first matching unit performs the first matching so as to fulfill the accepting conditions of each of the power receiving units, preferentially using the power supply unit having high priority.

4. The power distribution determination apparatus according to claim 1, further comprising a first history storage unit that stores the power supply unit in which a portion or the entirety of a supply energy has not been used in the first matching, wherein the first matching unit performs the first matching so as to fulfill the accepting conditions of each of the power receiving units, preferentially using the power supply unit stored in the first history storage unit in a previous first matching.

5. The power distribution determination apparatus according to claim 1, further comprising a power receiving unit priority acquisition unit that acquires priority of the power receiving unit,
wherein the first matching unit performs the first matching so as to preferentially fulfill the accepting conditions of the power receiving unit having high priority.

6. The power distribution determination apparatus according to claim 4, further comprising a second history storage unit that stores the power receiving unit in which a portion or the entirety of demand energy has not been fulfilled in the first matching, wherein the first matching unit performs the first matching so as to preferentially fulfill the accepting conditions of the power receiving unit stored in the second history storage unit in a previous first matching.

7. The power distribution determination apparatus according to claim 1, further comprising a matching result information generation unit that generates a matching result information, the matching result information being information indicating a combination of an arbitrary power receiving unit and a surplus power supply unit supplying power to the arbitrary power receiving unit.

8. A control method, executed by a computer, for distributing power from a plurality of power supply units to a plurality of power receiving units, the control method comprising:
receiving supply information from each of the power supply units, the supply information indicating a supply energy, the supply energy including energy or expected energy available for supply from the power supply unit;
receiving demand information from each of the power receiving units, the demand information indicating a demand energy and accepting conditions, the demand energy including a required energy or an expected required energy for each of the power receiving units, the accepting conditions being conditions associated with a power supply unit selected to supply power;
performing a first matching for determining a first one or a first plurality of the power supply units for supplying power to each of the power receiving units so as to fulfill the accepting conditions corresponding to each power receiving unit;
identifying a plurality of surplus power supply units based on the first matching, the surplus power supply units being the power supply units in which a portion or an entirety of the supply energy is not used;
identifying a plurality of arbitrary power receiving units based on the first matching, the arbitrary power receiving units being the power receiving units in which a portion or an entirety of the demand energy is not fulfilled;
performing a second matching for determining a second one or a second plurality of the surplus power supply units for supplying power to each of the arbitrary power receiving units so as to fulfill the demand energy of each of the arbitrary power receiving units; and
controlling a power distribution apparatus for distributing power from the power supply units to the power receiving units based on the first matching and the second matching.

9. A non-transitory computer-readable storage medium storing program instructions, which when executed by a computer cause the computer to perform a method of distribution of power from a plurality of power supply units to a plurality of power receiving units, the method comprising:
receiving supply information from each of the power supply units, the supply information indicating a supply energy, the supply energy including energy or expected energy available for supply from the power supply unit;
receiving demand information from each of the power receiving units, the demand information indicating a demand energy and accepting conditions, the demand energy including a required energy or an expected required energy for each of the power receiving units, the accepting conditions being conditions associated with a power supply unit selected to supply power;
performing a first matching for determining a first one or a first plurality of the power supply units for supplying power to each of the power receiving units so as to fulfill the accepting conditions corresponding to each power receiving unit;
identifying a plurality of surplus power supply units based on the first matching, the surplus power supply units being the power supply units in which a portion or an entirety of the supply energy is not used;
identifying a plurality of arbitrary power receiving units based on the first matching, the arbitrary power receiving units being the power receiving units in which a portion or an entirety of the demand energy is not fulfilled;
performing a second matching for determining a second one or a second plurality of the surplus power supply units for supplying power to each of the arbitrary power receiving units so as to fulfill the demand energy of each of the arbitrary power receiving units; and
controlling a power distribution apparatus for distributing power from the power supply units to the power receiving units based on the first matching and the second matching.

10. The power distribution determination apparatus according to claim 1, wherein the second matching unit is configured to perform the second matching without fulfilling the accepting conditions associated with the second one of the second plurality of the surplus power supply units.

11. The control method according to claim 8, wherein the supply information indicates an attribute of a corresponding power supply unit, and the accepting conditions include conditions for the attribute.

12. The control method according to claim 8, further comprising acquiring priority of each of the power supply units, wherein performing the first matching includes preferentially using the power supply unit having high priority.

13. The control method according to claim 8, further comprising storing the power supply unit in which a portion or the entirety of a supply energy has not been used in the first matching, wherein performing the first matching includes using the stored power supply unit stored in a previous first matching.

14. The control method according to claim 13, further comprising storing the power receiving unit in which a portion or the entirety of demand energy has not been fulfilled in the first matching, wherein performing the first matching includes preferentially fulfilling the accepting conditions of the stored power receiving unit stored in a previous first matching.

15. The control method according to claim 8, further comprising acquiring priority of the power receiving unit, wherein performing the first matching includes preferentially fulfilling the accepting conditions of the power receiving unit having high priority.

16. The control method of claim 8, further comprising generating a matching result information, the matching result information including a combination of an arbitrary power receiving unit and a surplus power supply unit supplying power to the arbitrary power receiving unit.

* * * * *